United States Patent [19]
Weres et al.

[11] Patent Number: 5,364,508
[45] Date of Patent: Nov. 15, 1994

[54] ELECTROCHEMICAL METHOD AND DEVICE FOR GENERATING HYDROXYL FREE RADICALS AND OXIDIZING CHEMICAL SUBSTANCES DISSOLVED IN WATER

[76] Inventors: Oleh Weres, P.O. Box 116, Vineburg, Calif. 95487; Michael R. Hoffmann, 1625 Laurel St., South Pasadena, Calif. 91030

[21] Appl. No.: 213,980

[22] Filed: Mar. 16, 1994

Related U.S. Application Data

[63] Continuation-in-part of Ser. No. 975,059, Nov. 12, 1992, abandoned.

[51] Int. Cl.⁵ .............................................. C02F 1/461
[52] U.S. Cl. .................................... 204/128; 204/149; 210/748; 210/758; 588/207; 588/215; 588/242
[58] Field of Search ............... 204/128, 149, 290 F; 210/748, 758; 588/207, 215, 242

[56] References Cited

U.S. PATENT DOCUMENTS 4,676,878 6/1987 Chez ................................. 204/101

*Primary Examiner*—John Niebling
*Assistant Examiner*—Arun S. Phasge
*Attorney, Agent, or Firm*—Harold D. Messner

[57] ABSTRACT

This invention provides electrochemical methods for producing hydroxyl free radicals and decomposing by oxidation chemical substances dissolved in water. It utilizes a novel electrode which is capable of operation at sufficiently positive anodic potential to produce hydroxyl radicals. A complete device for oxidizing chemical substances dissolved in water is described, and operating conditions favorable to the method are discussed. Examples of oxidation reactions are presented, including oxidation of an herbicide, an insecticide, toluene, cresol, and a fluoroalkyl surfactant.

20 Claims, 11 Drawing Sheets

ELECTROCHEMICAL METHOD AND DEVICE FOR GENERATING HYDROXYL FREE RADICALS AND OXIDIZING CHEMICAL SUBSTANCES DISSOLVED IN WATER

This application is a continuation-in-part of application Ser. No. 07/975,059, filed Nov. 12, 1992, titled "Electrochemical Process and Device for Generating Hydroxyl Free Radicals and Oxidizing Chemical Substances Dissolved in Water," now abandoned.

REFERENCES CITED

| U.S. Pat. Documents | | |
|---|---|---|
| 3,948,751 | 4/1976 | Bianchi et al. |
| 4,003,817 | 1/1977 | Bianchi et al. |
| 4,077,862 | 3/1978 | Okazaki |
| 4,110,180 | 8/1978 | Nidola et al. |
| 4,676,878 | 1/1987 | Chez |

Other Publications

M. S. E. Abdo and R. S. Al-Ameeri. *J. Envir. Sci. Health*, A22, 27–45 (1987).

G. V. Buxton, C. L. Greenstock, W. P. Helman and A. B. Ross. *J. Phys. Chem. Ref. Data*, 17, 513–759 (1988).

R. N. Gedye, Y. N. Sadana, A. C. E. Edmonds and M. L. Langlois. *J. Appl. Electrochem*. 17, 731–736 (1987).

U. K. Kläning, K. Sehested, and J. Holcman. *J. Phys. Chem*. 89, 760–763 (1985).

C. Kormann, D. W. Bahnemann, and M. R. Hoffmann. *Envir. Sci. Technology*, 25, 494–500 (1991).

A. T. Kuhn, pp. 98–130 in J.O'M. Bockris, Ed., *Electrochemistry for a cleaner environment*, Plenum Press (New York, 1971).

A. T. Kuhn. *J. Appl. Chem. Biotechnol*. 21, 29–33 (1971a).

L. Marincic and F. B. Leitz. *J. Appl. Electrochem*. 8, 333–345 (1978).

R. N. Noufi, P. A. Kohl, S. N. Frank and A. J. Bard. *J. Electrochem. Soc*. 125, 246–252 (1978).

H. A. Schwartz and R. W. Dodson. *J. Phys. Chem.*, 88, 3643–3647 (1984).

R. Tomat and A. Rigo. *J. Appl. Electrochem*., 14, 1–8 (1984).

BACKGROUND OF THE INVENTION

Background—Field of Invention

The present invention provides a method for electrochemically generating hydroxyl free radical, a method for oxidizing chemical substances dissolved or dispersed in water, and a water purification device utilizing these methods.

Background—Related Patent Applications

The electrodes and electrochemical cells utilized in this method and a method for producing said electrodes are provided in the related U.S. patent application titled "Electrode, Electrode Manufacturing Process, and Electrochemical Cell", Ser. No. 08/194,727, filed Feb. 10, 1994 by the same inventors. These electrodes consist of a titanium metal substrate with an oxide coating comprised of titanium dioxide that is doped with niobium or tantalum, wherein the mole fraction of niobium or tantalum in the +4 valence state relative to total metal is 0.25 percent or greater.

The above identified related patent application Ser. No. 08/194,727 is hereby incorporated by reference.

Background—Discussion of Prior Art

Electrochemical methods are sometimes used to remove or decompose chemical impurities in water. For example, cathodic reduction is used to remove heavy metal ions including copper, nickel, and silver (Kuhn 1971). Anodic oxidation may be used to destroy cyanide and phenols (Kuhn 1971a), ammonia (Marincic and Leitz 1978), and organic dyes (Abdo and Al-Ameeri 1987). All of these applications involve very specific anodic reactions involving very specific substrates that occur at moderate anodic potentials, far below the potential required to generate hydroxyl. Only partial oxidation of the target substrate is achieved. Undesirable byproducts may be formed; for example, electrolytic oxidation of phenol may produce some amount of chlorophenol, an even more objectionable water pollutant. No prior art recited above is able to completely oxidize organic substrates, nor oxidize in a nonspecific manner a wide variety of chemical substances dissolved in water.

An electrochemical method involving the generation of $NO_3 \cdot$ radicals in a medium containing nitric acid has been reported (Gedye and others 1987). The free radicals produced react with dissolved organic compounds and destroy them. This reaction requires a high concentration of nitric acid, and the electrolyte is highly corrosive. It is therefore practically limited to destroying organic compounds dissolved in strong acid solutions.

Hydroxyl free radical is a very powerful, nonspecific oxidizing species which attacks most organic molecules as well as oxidizable inorganic molecules and ions (Buxton and others, 1988). Hydroxyl free radical is produced by irradiation with ultraviolet light of particles of titanium dioxide dispersed in water (Kormann and others, 1991), and hydroxyl thus produced reacts with and degrades organic substances in solution. The hydroxyl radicals produced by the photochemical reaction are believed to be bound to the surface of the $TiO_2$ particles (S.OH), and the oxidation of the substrate occurs at the surface (same ref.). The photochemical method remains largely a laboratory curiosity, because sunlight contains only a small fraction of usable UV energy, and the photochemical method has a small quantum yield. In the laboratory, hydroxyl is produced by reaction of hydrogen peroxide with iron salts dissolved in mildly acidic solution, called Fenton's Reaction.

An indirect method of producing hydroxyl involving several reactions at the cathode has been reported (Tomat and Rigo 1984). This method involves the production of hydrogen peroxide by reduction of oxygen at the cathode, while simultaneously reducing ferric iron in solution to ferrous iron. Hydrogen peroxide then reacts with ferrous iron to produce hydroxyl radical (Fenton's Reaction). Other multivalent metal ions may be used in place of iron; for example, silver. The ability to oxidize toluene and other organic compounds dissolved in water using this method has been demonstrated, but the method is inefficient and generally impractical for several reasons. First, the theoretical maximum current yield is one-third mole of hydroxyl per Faraday of charge passed through the cell. Second, a soluble salt of a multivalent metal must be added to the solution. In the case of iron, the solution must be acidic in order for ferric iron to remain in solution. Other ions, notably silver, are undesirable because of toxicity or price. Finally, the rate of reaction is limited by the rate of diffusion of dissolved oxygen toward the surface of the cathode, which is proportional to the concentration of oxygen dissolved in air saturated water, and therefore small.

CHEZ, U.S. Pat. No. 4,676,878 described the electrochemical production of hydroxyl free radical utilizing electrodes with various semiconducting surface compositions. Chez teaches that at least 12.6 volts must be applied to power the electrochemical cell, which he describes as consisting of a single anode, a single cathode, and aqueous electrolyte between them. In reference to five of his seven Examples, Chez stated that 14.5 volts was applied to the cell, and in reference to two of his examples he stated that current density averaged 0.0025 amperes per square inch=0.4 mA cm$^{-2}$. Chez did not report anode potential, but at this current density the cathode potential would have been between 0 and $-2$ volts; therefore, in Chez's Examples 14.5 V cell voltage corresponds to $E_{anode}$=12.5-14.5 V vs. NHE, and the 12.6 V cell voltage that Chez teaches is necessary to produce hydroxyl free radical corresponds to $E_{anode}$=10.6-12.6 V vs. NHE. Chez also teaches that the part of the surface of the anode whereupon hydroxyl free radicals are generated should be coated with a p-type semiconductor.

BIANCHI, U.S. Pat. Nos. 3,948,751 and 4,003,817 has described electrodes wherein a titanium metal base is covered with an oxide coating which contains titanium dioxide, a large proportion of a platinum group metal, and in some examples also niobium or tantalum. The electrode preparation methods described by Bianchi involve brushing on to a titanium metal substrate a solution which contains compounds of the metals desired in the oxide coating, and then heating the electrode in air to evaporate and thermally decompose the coating solution and produced the desired oxide coating.

The electrodes described by Bianchi cannot be operatively combined with Chez to produce hydroxyl free radicals. The platinum group metals in the oxide coating will catalyze the electrolysis of water to molecular oxygen at a value of anode potential much less than that required to produce hydroxyl free radical. If such an electrode is polarized to a potential large enough, in principle, to produce hydroxyl free radicals, it will produce abundant oxygen bubbles, but little or no hydroxyl free radical.

Bianchi also mentions as a ramification the possibility of producing an electrode wherein a titanium metal base is covered with an oxide coating consisting of titanium dioxide doped with either niobium or tantalum, but no platinum group metal. Bianchi apparently did not implement this possibility, because his examples do not include electrodes which correspond to this description. The reason this possibility was not implemented by Bianchi is that the resulting electrodes would be inoperative due to low electrical conductivity of the oxide coating resulting.

It is essential that at least part of the Nb or Ta in the oxide coating be in the +4 valence state, because the single valence electron remaining in Nb$^{+4}$ or Ta$^{+4}$ provides the n-type doping which imparts useful electrical conductivity to the oxide coating. In the electrodes disclosed in the above identified Related Patent Application hereby incorporated by reference, Nb or Ta in the oxide coating is converted to the +4 oxidation state by annealling the coated electrodes under hydrogen containing a small amount of water vapor, and this annealling process imparts useful conductivity to the electrodes. The effect of reducing the Nb or Ta to the +4 valence state is illustrated in FIG. 7, wherein annealling under hydrogen increased the current density by a factor of 50 to 100.

NIDOLA, U.S. Pat. No. 4,110,180 describes electrodes comprising a Ti-metal substrate with an oxide coating that includes titanium dioxide and a platinum group metal oxide (ruthenium dioxide in Nidola's examples), wherein the Ti-metal substrate is alloyed with up to ten percent Nb or Ta. The presence of the platinum group metal oxide makes Nidola's electrodes inoperable for production of hydroxyl free radicals, and the Nb or Ta in the electrode is in the Ti-metal substrate, not in the oxide coating.

OKAZAKI, U.S. Pat. No. 4,077,862 describes an electrochemical device which changes the pH of water by electrolytic means. While OKAZAKI says that the water is "separated into two components having hydroxyl radical in different densities", it is entirely clear from the description of the invention and the Examples that "hydroxide ion" was meant, not "hydroxyl free radical".

OBJECTS AND ADVANTAGES

In the above identified Related Patent Application, we have disclosed an electrode which is capable of operating at a potential sufficiently positive to produce hydroxyl free radicals and release them to aqueous solution. The electrodes consist of a titanium or titanium alloy substrate, with a coating of crystalline titanium dioxide doped with either niobium or tantalum in the +4 oxidation state. Useful conductivity is imparted to the electrode when the mole fraction of the additive metal is in the range of 0.25 to 25 percent and the additive metal is predominantly in the +4 oxidation state, and the preferred composition range is 2 to 6 mole percent.

We have demonstrated that hydroxyl free radicals can be produced and organic substances dissolved in water can be oxidized at $E_{anode}$ less than four volts vs. NHE, a finding that is surprising and unexpected in light of Chez's teachings. We have further demonstrated that some organic compounds dissolved in water can be oxidized by surface bound hydroxyl free radicals at the surface of the anode at $E_{anode}$ less than two volts vs. NHE. We have demonstrated the operability of these methods at current densities much higher than disclosed by Chez. We have further found that operating our anodes in the range of anode potential taught by Chez damages them. The range of anode potential and current density specified for our method reflects these observations, which are specific to our electrodes. Therefore, in this case structure affects method steps.

The possibility of generating hydroxyl free radical by the oxidation of water or hydroxide ion at the surface of an anode is not obvious, because most electrode materials are sufficiently electrocatalytic to oxidize water and generate oxygen at an electrode potential far below that required to generate hydroxyl. For example, conventional titanium anodes are doped with platinum group metals to catalyze the evolution of oxygen, thereby allowing them to operate at a potential not much greater than that required to generate molecular oxygen, which is equal to 1.19−0.0592 pH volts at room temperature. Doping with niobium or tantalum has no such effect. In addition, most electrode materials, including nearly all metallic compositions, will corrode severely when exposed to a positive potential large enough to generate hydroxyl free radical. Because of their composition, our anodes provide a good yield of hydroxyl free radicals and do not corrode when operated at a potential positive enough to generate hydroxyl free radical.

Organic molecules which contain aromatic rings and carbon-carbon double bonds are preferentially attacked by hydroxyl free radical in reactions which destroy the aromatic ring or the double bond (Buxton and others, 1988). This means that highly undesirable aromatic compounds that are sometimes formed by electrolysis or combustion, for example chlorophenol or tetrachlorodibenzodioxin ("dioxin"), would be preferentially attacked by hydroxyl, and therefore cannot be produced by this method.

We have demonstrated the electrolytic destruction of several organic compounds, including an herbicide and an insecticide, toluene, cresol, and a fluoroalkyl foaming agent, and have defined the process conditions advantageous to the method and described a practical device for operating the method.

We have successfully operated the method to oxidize organic compounds in water that has been rendered conductive by adding sodium bicarbonate to it, with the pH of the electrolyte controlled by bubbling air containing carbon dioxide through it. Sodium bicarbonate is an entirely innocuous chemical, and carbon dioxide is an innocuous product of the oxidation reaction. No other electrolytic method is able to nonselectively oxidize many organic compounds under these mild conditions.

Hydroxyl free radical is the most powerful oxidizing agent that can exist in an aqueous medium; any stronger oxidizing agent (for example, an oxygen atom) will oxidize water to make HO.(aq). Therefore, it may be said that we have invented the most powerful oxidizing process possible for destruction of organic contaminants dissolved or dispersed in water.

The method disclosed is especially appropriate for destroying small amounts of highly toxic organic compounds dissolved or dispersed in water. An important potential application related to agriculture is to destroy insecticides or herbicides dissolved in water; for example, left over spray solution, or water used to rinse storage containers or spraying equipment. Another important application related to the production and refining of petroleum is to destroy small concentrations of aromatic hydrocarbons and phenols dissolved in water. All other methods available for these applications are more complex, more expensive, produce solid waste, or produce air pollution.

Water soluble sulfur containing ions and other oxidizable inorganic species may also be destroyed using this method.

DESCRIPTION OF THE INVENTION

The present invention provides a method for electrochemically generating hydroxyl radical, a method for oxidizing chemical substances dissolved or dispersed in water, and a water purification device utilizing a coated electrode that is described in the above identified related application.

Description of the invention—Definitions

"Additive metal" refers to Nb or Ta or some combination thereof present in the oxide coating of our electrodes as $NbO_2$ or $TaO_2$.

"Anneal" or "hydrogen anneal" refers to the final step in producing the electrodes, wherein the electrode is heated at a temperature between 600° and 1000° C. in an atmosphere of hydrogen which includes a sufficient amount of water vapor to prevent hydrogen embrittlement or hydriding of the Ti-metal substrate.

"Anode" is an electrode to which positive voltage is applied.

"Anode potential" is the electrode potential of an anode.

"Aqueous hydroxyl free radical" or HO.(aq) is a hydroxyl free radical free to diffuse through the aqueous medium and not bound to the surface of the electrode.

"Bicarbonate buffer" refers to 0.2M $NaHCO_3$ solution saturated with air containing 6 percent carbon dioxide, with pH=8.20 at 25° and pH =8.9 at 90° C.

"Bipolar cell" comprises a multiplicity of bipolar electrodes assembled in an array so that current flows through the cell perpendicular to the bipolar electrodes. The source of electric current is connected to the electrodes at either end of the array, and flows through the entire array. An electrochemical cell of this kind is depicted in FIG. 2 of the above identified related application.

"Bipolar electrode" is a planar electrode wherein one surface serves as an anode, and the other surface serves as a cathode.

"Cathode" is an electrode to which negative voltage is applied.

"Cell voltage" ($V_{cell}$) is the voltage applied to power an electrochemical cell consisting of one anode and one cathode with electrolyte between them. This is the strict scientific definition of "electrochemical cell" and "cell voltage".

"Class I electrodes" conduct very little current when $E_{anode}$ is less than the minimum turn-on potential required to generate HO.(aq), and i increases rapidly when $E_{anode}$ exceeds this value, indicating that production of HO.(aq) is the major electrode reaction.

"Class II electrodes" begin to conduct current up to 0.5 volts below the minimum turn-on potential for producing HO.(aq), and i increases smoothly as $E_{anode}$ is increased beyond the turn-on potential, indicating that both HO.(aq) and S.OH are being produced.

"Current density" i is the electrical current passing through part of an electrode, divided by the surface area of that part, measured in amperes per square centimeter.

"Current limited regime" describes the situation wherein the rate of reaction is limited by the current density "Diffusion limited regime" describes the situation wherein the rate of reaction is limited by the rate of diffusion of substrate molecules toward the surface of the anode.

"$E_{HO,aq}$" is the equilibrium half-cell potential for production of HO.(aq) given by eqn. (2).

"$E^0_{HO,aq}$" is the standard half-cell potential for production of HO.(aq), eqn. (1); that is, when pH=log $h_0$=0.

"$E_{max}$" is the maximum anodic potential at which the electrode may be operated without fear of permanent damage.

"$E_{O2/H2O}$" is the half-cell potential for reduction of oxygen, given by eqn. (9).

"$E_{min}$" is the minimum value of anode potential required to generate S.OH given by eqn. (8).

"$E_{TO,bicarb}$" is the approximate value of turn-on potential in the bicarbonate buffer solution, given by eqn. (5).

"Electrically conductive aqueous medium" is the aqueous solution in the electrochemical cell, which contains dissolved electrolytes in concentration adequate to provide the electrical conductivity required by the method, and may also contain dissolved or dispersed oxidizable substances.

"Electrochemical cell" or simply "cell" comprises one or more anodes, one or more cathodes, and an aqueous electrolyte is present between adjacent anodes and cathodes. This is the common technical usage of "electrochemical cell". An "electrochemical cell" in this usage may actually consist of several "electrochemical cells", strictly defined, in series and then the overall "cell voltage" will be a multiple of the "cell voltage", strictly defined.

"Electrode" is a term that includes both "anode" and "cathode". If alternating current is used, the same electrode may alternate between serving as an anode and a cathode.

"Electrode potential" is the potential relative to the Normal Hydrogen Electrode (NHE).

"$h_0$" is the concentration of HO.(aq) immediately adjacent to the surface of the anode in moles/L.

"HO.(aq)" is "aqueous hydroxyl free radical".

"Half-cell potentials" are always quoted as reduction potentials, whether a reduction reaction or an oxidation reaction is being discussed.

"Hydroxyl free radical" includes "surface bound hydroxyl free radical" as well as "aqueous hydroxyl free radical".

"i" is "current density".

"Internal part": see "surface part".

"Mole fraction of additive metal" or simply "mole fraction" is the mole fraction of (Nb+Ta) relative to total moles of metal in the oxide coating expressed as a percentage:

mole fraction $= 100\% \times (Nb+Ta)/(Ti+Nb+Ta+\text{other metals})$.

"Mole fraction of additive metal in the +4 valence state relative to total metal" in the oxide coating $= 100\% \times (Nb^{+4}+Ta^{+4})/(Ti+Nb+Ta+\text{other metals})$.

The numerator is the number of moles of $Nb^{+4}+Ta^{+4}$ in the +4 state only, while the denominator includes the number of moles of all metals in the oxide coating, regardless of oxidation state.

"Organic substances" include organic compounds, organic free radicals, and organic ions.

"Oxidize" includes the decomposition and destruction of chemical substances by means of oxidation reactions, as well as oxidation reactions intended to effect a specific chemical transformation. The specific reactions of hydroxyl free radical include (a) abstraction of hydrogen atoms, (b) extraction of electrons, and (c) addition of hydroxyl to a double bond or aromatic ring, all of which are properly considered to be oxidation reactions.

"pH" is minus the decimal logarithm of the hydrogen ion activity in the water in said electrochemical cell.

"Platinum group metals" are Ru, Rh, Pd, Os, Ir, and Pt.

"Porous anode", is comprised of a metallic substrate formed of Ti-metal fibers or particles, sintered or welded or otherwise fused at their contact points to produce a porous and permeable, but physically coherent and electrically conductive structure, and said metallic substrate is coated with an oxide coating of appropriate composition. In another embodiment, the porous anode consists of particles of mixed metal oxide material of appropriate composition, pressed, sintered, or otherwise fused together to produce an electrically conductive structure.

"S" represents the surface of the electrode.

"S—OH" represent an hydroxide ion, $HO^-$, bound to the surface of the electrode.

"S.OH": see "surface bound hydroxyl free radical".

"Semiconducting" is used to describe both lightly doped and very heavily doped metal oxide compositions, which behave as degenerate semiconductors.

"Semiconducting metal oxide composition" refers to the composition of the oxide coating of the anode or, if the anode is a solid body of uniform composition, to the composition of the anode.

"Substrate" is the organic or inorganic chemical species dissolved in water which is oxidized by reaction with hydroxyl free radicals.

"Surface bound hydroxyl free radical" or S.OH is a hydroxyl free radical that is bound to the surface of the anode or another similar free radical species bound to the surface of the anode; for example, oxide radical ion $.O^-$ bound to the surface of the anode.

"Surface part" refers to a part of the anode in contact with the electrically conductive aqueous medium. If the anode is comprised of a metallic substrate that is partially or completely covered with a semiconducting metal oxide coating, the oxide coating comprises the "surface part", and the metallic substrate comprises the "internal part". The same definition applies if the anode is a porous anode comprising a fibrous or particulate metallic substrate wherein the fibers are covered with a semiconducting metal oxide coating. If the anode is a solid body of uniform composition, the composition of the surface part is the same as the composition of the internal part, and the distinction between them becomes arbitrary.

"T" is the absolute temperature in Kelvins.

"Turn-on potential" is the potential of an ideal hydroxyl electrode which behaves consistently with eqn. (3), and may be calculated by estimating and inserting the proper value of $h_0$ into eqn. (3). $h_0$ and turn-on potential are both functions of T, i, and the composition of the electrically conductive aqueous medium. Eqns. (5) and (7) are expressions for the value of turn-on potential ($E_{TO,bicarb}$ and $E_{TO}$) for particular compositions of the electrically conductive aqueous medium and values of i.

"$V_{cell}$" is "cell voltage".

Description of the Invention—Electrode Reactions

When the anodes described in the above identified related patent application are polarized to a sufficiently high positive potential, water molecules at the surface of the anode will be oxidized, producing hydroxyl free radicals according to the electrochemical reaction $$H_2O(aq) \rightarrow HO.(aq) + e^- + H^+ \qquad (1)$$

where H₂O(aq) and HO.(aq) represent a water molecule and a hydroxyl free radical in the aqueous phase; that is, very near to the surface of the electrode (probably within 1 nm), but not physically bound to it. The anodic potential required to generate hydroxyl free radicals will vary with temperature, pH in the solution, and the concentration of HO.(aq) at the surface of the anode ($h_0$). The Nernst equation describing the half-cell reaction (1) at 25° C. is:

$$E_{HO,aq} = 2.74 + 0.0592(\log h_0 - pH) \qquad (2)$$

where the value $E^0_{HO,aq} = 2.74$ is quoted from Kläning and others (1985). (Even though reaction 1 is written as an oxidation reaction, eqn. 2 gives the corresponding half-cell potential as a reduction potential; all half-cell potentials are given as reduction potentials throughout this application.) Employing the method described Schwartz and Dodson (1984) to calculate the temperature dependence of $E^0_{HO,aq}$, we have derived the temperature dependent expression $$E_{HO,aq} = 3.06 - 0.00108T + 0.0001984T(\log h_0 - pH) \qquad (3)$$

where T is the absolute temperature in Kelvins, and the equation holds for 0°–100° C. These expressions for $E_{HO,aq}$ apply only to reaction (1), producing HO.(aq). Eqn. (3) describes an ideal reversible electrode, and does not depend on the composition of the electrode's surface, as long as it behaves as an ideal, reversible electrode in relation to reaction (1). Actual electrodes will operate at somewhat higher potential because of overvoltage effects. Therefore, eqn. (3) describes a theoretical lower limit of the potential required to produce HO.(aq), which we call the "turn-on potential". The discrepancy between a real electrode and the ideal electrode described by eqn. (3) will be small at small current density, and it will increase rapidly with increasing current density. The maximum current density compatible with nearly ideal electrode behavior will increase with the doping level of the electrode.

The concentration of HO.(aq) near the surface of the anode ($h_0$) is a function of current density, which is approximately proportional to the rate of production of HO.(aq), and also a function of the composition of the aqueous medium, because reaction with substances dissolved in the aqueous medium comprises the major sink for HO.(aq). The value of $h_0$ may be calculated to a good approximation using a simple model of coupled diffusion and chemical reaction developed by us, together with rate constants for reactions of HO.(aq) with various substrates presented by Buxton and others (1988). For example, in 0.2M NaHCO₃ saturated with air containing 6% CO₂ at 25° C., pH=8.0, most of the HO.(aq) will react with bicarbonate ion, and $$\log h_0 = -3 + \log i \qquad (4)$$

where $h_0$ is in moles/L and i is in amperes cm⁻², and the formula for the turn-on potential, given by substituting eqn. (4) and pH =8.0 into eqn. (2) is $$E_{TO,bicarb} = 2.09 + 0.0592 \log i \qquad (5)$$

Solid line 32 in FIG. 8 was plotted using eqn. (5).

A hydroxyl free radical bound to the surface of the electrode may be produced by oxidation of an hydroxide ion or a water molecule that is adsorbed to the surface of the electrode:

$$S-OH \rightarrow S.OH + e^- \qquad (6)$$

where S represents the surface of the electrode. Because the surface bound hydroxyl free radical is stabilized by being bound to the surface, the required anode potential for reaction (6) is smaller than the anode potential required for reaction (1) at equal current density, i.

Reactions (1) and (6) are two distinct, competing reactions that may take place simultaneously at the surface of the anode. The proportion between them will depend on the detailed surface properties of the anode, and upon the anode potential. Reaction (1) can take place only when $E_{anode}$ exceeds the turn-on potential. (The exact value of turn-on potential will, of course, vary with electrolyte composition and temperature.) Above the turn-on potential, the current associated with reaction (1) increases rapidly. Most of the electrodes described in the above identified related patent application exhibit a well-defined turn-on potential in bicarbonate buffer equal to that predicted by eqn. (5) or slightly larger; for example the three electrodes labeled 28 in FIG. 8. With these electrodes, the current density at $E_{anode} < E_{TO}$ is very small and erratic, indicating that reaction (6) is relatively unimportant. We call these electrodes "Class I electrodes".

The minimum anode potential $E_{min}$ required for reaction (6) is at least 0.5 volts smaller than the turn-on potential for reaction (1), but the current density associated with reaction (6) increases more slowly with increasing anode potential. Some electrodes exhibit a significant, stable, and reproducible current density at $E_{anode} < E_{TO}$, consistent with reaction (6).

At $E_{anode} < E_{TO}$ the only free radicals produced are S.OH or similar species, for example, surface bound oxide radical ion S⁻O., and it is believed that at $E_{anode} > E_{TO}$ reactions (1) and (6) both take place, producing HO.(aq) together with S.OH. We call these electrodes "Class II electrodes"; for example, the curve designated 30 in FIG. 8.

The extent to which an electrode exhibits Class II behavior depends on how it was made and its history after it was produced. Most of our electrodes fall into Class I, including all electrodes made using organic coating solutions, described in Examples 1, 2 and 3 in the related patent application cited above.

Among electrodes made using aqueous coating slurries as described in Example 8 in the related patent application, the degree of Class II behavior (indicated by significant current density at $E_{anode} < E_{TO}$) was correlated with the practice of allowing the electrode to cool-down in an atmosphere of hydrogen after being annealled under hydrogen, and with a history of operation above 85° C. in bicarbonate buffer.

Class II behavior appears to be associated with the surface structure of the anode; in particular, the degree of hydration. Maintaining the electrode under hydrogen after annealling and then exposing it to hot electrolyte solutions favor the formation of S—OH groups on the surface of the anode, and increased surface density of S—OH obviously favors reaction (6).

As discussed below, S.OH is not quite as powerful an oxidizing agent as HO.(aq). Whether Class I or Class II behavior is desired will depend on whether or not the particular substrate can be efficiently oxidized by reaction with S.OH. If yes, then a Class II electrode will give abundant reaction at a lower anode potential and energy cost. If no, then a Class I electrode will produce the largest possible amount of HO.(aq) without wasting current to make S.OH.

While we believe that the theoretical explanations presented in this section are correct, we do not wish to be bound by them.

Description of Invention—Operating Limits

Pronounced Class II behavior is illustrated in FIG. 9, wherein the data were generated using the same electrode as used to generate data labeled 30 in FIG. 8. The data in FIG. 9 were collected using an acetate buffer solution that contains 0.1M acetic acid plus 0.1M sodium acetate. Assuming this electrolyte composition and $i=0.25$ mA cm$^{-2}$ gives log $h_0 \cong -7$, and eqn. (3) takes the special form:

$$E_{TO} = 3.06 - 0.00247T - 0.0001984 \text{pH } T \quad (7)$$

Line 13 in FIG. 9 was plotted by setting pH=4.72 in eqn. (7), which corresponds to the pH value of this solution averaged over the interval 25° to 90° C. Eqn. (7) also describes $E_{TO}$ in a solution containing 0.05M sodium formate at $i=1$ mA cm$^{-2}$.

At $E_{anode} > E_{TO}$ given by eqn. (7) our Class I electrodes produce HO.(aq), and our Class II electrodes produce both HO.(aq) and S.OH.

Even the data collected at $i=4$ mA cm$^{-2}$ in the acetate buffer plot below line 13 in FIG. 9, indicating that reaction (6) predominates at least up to $i=4$ mA cm$^{-2}$ with this electrode.

The surface bound hydroxyl free radical produced in reaction (6) is less energetic than HO.(aq) produced in reaction (1), consistent with the lower anode potential required for make S.OH. While S.OH is not quite as reactive as HO.(aq), it will, in fact oxidize many organic and inorganic substrates; indeed, photochemical oxidation methods involving UV irradiation of TiO$_2$ particles dispersed in water utilize S.OH. We have demonstrated the oxidation of formate ion in the range of potential below line 13 in FIG. 9, and current density down to $i=0.1$ mA cm$^{-2}$ (FIG. 3, Example 5, below). Perhaps not all substrates will be rapidly decomposed in this range of potential, but some certainly will.

Line 14 in FIG. 9 is plotted approximately 0.2 volts below the data collected at $i=0.1$ mA cm$^{-2}$ using the formula $$E_{min} = 2.06 - 0.00147T - 0.0001984 \text{pH } T \quad (8)$$

with pH set to 4.72. Line 14 lies about 0.4 V above the reduction potential for oxygen gas at 1 atmosphere pressure, which is represented by line 12 in FIG. 9, and at pH 4.72 is given by $$E_{O_2/H_2O} = 1.48 - 0.001767T \quad (9)$$

Line 14 represents our estimate of the minimum anode potential required to produce S.OH sufficiently energetic to oxidize a useful assortment of substrates.

The relationship between $E_{anode}$ and i depends strongly upon the properties of the anode, and in particular depends upon the degree of n-doping of the semiconducting metal oxide surface composition of the anode. Indeed, the ability to pass a given current at a given potential and pH depends on the composition, level of doping, and other properties of the anode.

At pH 8 and room temperature, applying 3.45 V anodic potential to an electrode wherein the surface composition comprises TiO$_2$ doped with 4 mole percent of Nb$^{+4}$ produces a sustainable current density of 15–50 mA cm$^{-2}$, depending on the detailed preparation and history of the particular electrode. The corresponding cell voltage will be in the range 4–8.5 volts, depending upon the pH and conductivity of the electrically conductive aqueous medium, and the geometry of the cell. Lower doping levels decrease the current density approximately in proportion, and i also drops off at higher doping levels. Typical results for i vs. $V_{cell}$ and i vs. $E_{anode}$ are presented in FIGS. 7 and 8. In contrast to our electrodes, the electrodes used by Chez conducted about 0.45 mA cm$^{-2}$ at an anode potential that exceeded 10.6 volts, and cell voltage typically equal to 14.5 volts.

In our work, we usually have not exceeded $E_{anode} = 3.45$ V at pH 8, and we know from experience that an electrode doped at 4 percent Nb$^{+4}$ will operate well up to at least that potential. This value corresponds to the formula $$E_{max} = 4.0 - 0.0001984 \text{pH } T \quad (10a)$$

For a given concentration of substrate in solution, increasing i will increase reaction rate only up to a certain point; above a certain value of i, the rate of reaction will be limited by the rate of diffusion of substrate molecules to the surface of the anode. Also, above a certain value of $E_{anode}$ the anode may be damaged. With electrodes doped with 4 four mole percent Nb$^{+4}$, we find that damage is small up to about $E_{anode} = 4.2$ V at pH 8, but the electrodes are severely damaged if polarized to 5.2 V for 10 minutes. $E_{anode} = 4.2$ V at pH 8 corresponds to the formula $$E_{max} = 4.7 - 0.0001984 \text{pH } T \quad (10b)$$

Theoretical estimates of electric field strength within the space charge region just inside the surface of the anode, and dielectric strength as a function of doping level indicate that a less highly doped anode may be able to tolerate a higher anode potential without being damaged, albeit with correspondingly smaller current density. Allowing for lower doping levels and future improvements in electrode processing, we estimate that some electrodes will be able to operate without damage up to $$E_{max} = 6.2 - 0.0001984 \text{pH } T \quad (10c)$$

Hydroxyl free radical is a weak acid with pK$_a \cong 11.9$ at 25° C. At pH>11.9, HO. is converted to its conjugate base the oxide radical ion .O$^-$, which is much less reactive than HO. Also, at high pH Nb and Ta may be leached from the surface of the anode, damaging it. In strongly acid solutions with pH<2, TiO$_2$ may be attacked by acid, and the electrode will be damaged. For these reasons, we consider the maximum safe operating range for our method to be pH 2 to 12.

The presence of carbonate ions in the electrically conductive aqueous medium is undesirable, because carbonate is an excellent substrate for hydroxyl free radicals, and reaction with carbonate may interfere with more useful reactions. To avoid converting bicarbonate to carbonate (pk$_a \cong 10.2$), it is preferred to operate at pH<9. Below pH 4, there may be some small degree of corrosion, particularly if fluoride ion is present. To be absolutely safe, it is preferred to operate above pH 4.

FIG. 11 illustrates the limits on operating potential (expressed by eqns. 7, 8, 10a, 10b and 10c) and limits on electrolyte pH discussed above and recited in the claims. FIG. 11 was generated setting T=298.15K (=25° C.) in the equations recited in the claims.

Noufi and others (1978) have described electrodes comprising large single crystals of $TiO_2$ doped up to about 0.24 mole percent with $Ti^{+3}$. These electrodes conducted a small current when anodically polarized, 0.1 mA cm$^{-2}$ at 6.8 V anode potential, and 1 mA cm$^{-2}$ at 8.2 V anode potential in 0.5M sulfuric acid solution. It is possible that some HO. may have been produced, but Naufi and others did not mention this possibility. There are a few other similar reports in the literature involving similar electrodes, always involving very high anode potential and very small current density, and usually at pH<2 or pH>11.5. We have improved upon this prior art by using a better anode in the method, which allows i>1 mA cm$^{-2}$ while producing HO. in the range of $E_{anode}$ bounded by eqns. (7) and (10a), and pH 2 to 12.

There is no prior art known to us which teaches oxidation of organic compounds or sulfur compounds dissolved in aqueous media using electrochemically generated HO.(aq) and S.OH within the range of anodic potential and pH specified in the previous paragraph, regardless of current density.

While we believe that the theoretical explanations presented in this section are correct, we do not wish to be bound by them.

Description of Invention—Necessary Composition of the Anode

Proper anode surface composition is required for our methods to be operable. Because anode surface composition determines the range of anode potential required and preferred for method operation, anode surface composition has a large affect upon method steps.

All metals will be oxidized at the high anode potentials required to produce HO., and a metallic anode will corrode, or else it will be covered by a protective metal oxide layer of some thickness. Therefore, the choice of surface compositions is restricted to metal oxide compositions.

When polarized to $E_{anode}>E_{min}$, most anode materials will oxidize water to produce molecular oxygen instead of hydroxyl:

$$2H_2O \rightarrow O_2 + 4H^+ + 4e^- \quad (11)$$

Reaction (11) requires a suitably electrocatalytic anode to proceed with moderate overpotential; for example, Pt or $TiO_2$ doped with a Pt group metal oxide. In this case, most of the current will be consumed to produce $O_2$ at a potential less than that required to produce hydroxyl free radicals. While the Pt group metals are the best catalysts for oxidation of water, some other transition metals also favor the reaction, including Fe and Ni. The surface composition of our electrodes was purposely selected to not catalyze reaction (11). Therefore, reactions (1) and (6) predominate when $E_{anode}$ is sufficiently large.

The electrode itself must not be oxidized at the values of potential required to generate HO., other than reversible formation of S.OH or holes in the valence band. The metal ions in the metal oxide composition must not be oxidized at the operating potential, because oxidation of the metal ions will be part of a corrosion process, or will form part of a reaction cycle that oxidizes water to oxygen. This requirement is satisfied by a semiconducting metal oxide composition wherein the metal ion or ions are in their highest oxidation state, and have an electronic structure with either a filled shell (inert gas structure) or a filled subshell (d or f). If the band-gap of the oxide is too large, even heavy n-doping will fail to impart useful electrical conductivity; this consideration excludes $Al_2O_3$ and $SiO_2$ (which Chez employed) from practical consideration in our preferred range of anode potential.

The semiconducting metal oxide must be doped to provide the electrical conductivity needed to serve as an electrode. p-doping will not do, because the mobility of holes in a metal oxide is small, and they are energetically unstable. n-doping is provided by adding some amount of metal ions in the $+(n_d-1)$ valence state, where $n_d$ is the maximum valence state of the additive metal. The remaining electron enters the conduction band of the semiconducting metal oxide, providing conductivity. In our electrodes, $TiO_2$ is n-doped with $Nb^{+4}$ or $Ta^{+4}$. Doping with $Nb^{+4}$ results in a composition which is basically $TiO_2$ containing a few percent $NbO_2$ in solid solution. Because $TiO_2$ is extremely resistant to virtually all forms of chemical attack (other than reaction with HF or concentrated mineral acids), the $Nb^{+4}$ in the oxide is well protected from oxidation to $Nb^{+5}$. It should be noted that $NbO_2$ is itself a very inert compound with very low solubility like $TiO_2$, and is oxidized with difficulty, despite the oxidation reaction being thermodynamically favored.

$TiO_2$ may also be doped with $Ti^{+3}$ as reported by Noufi and others, and we have observed that electrodes coated with pure $TiO_2$ and annealed under hydrogen have electrical conductivity due to $Ti^{+3}$ which is comparable to doping with 0.25% $Nb^{+4}$, and similarly generate hydroxyl free radicals when polarized to the appropriate potential. However, the $Ti^{+3}$ ion is accompanied by anion vacancies which are easily filled by oxygen atoms, resulting in oxidation of $Ti^{+3}$ to $Ti^{+4}$ and consequent loss of conductivity. For this reason electrodes doped with $Ti^{+3}$ are inferior to electrodes doped with $Nb^{+4}$.

Finally, the metal oxide must be practically insoluble in water over some useful range of pH, or else the surface of the electrode will dissolve.

The single metal oxides meeting the criteria outlined above are: $TiO_2$, $ZrO_2$, $HfO_2$, $Nb_2O_5$, $Ta_2O_5$, ZnO, $Ga_2O_3$, $In_2O_3$, $GeO_2$, $SnO_2$, $PbO_2$, $CeO_2$ and $ThO_2$. To this list might be added $SrTiO_3$ and other titanates of group IIA metals, $KTaO_3$ and other niobates and tantalates of group IA metals. However, there are no suitable doping elements available for most of these oxides, which are compatible in regard to oxidation potential, ionic radius, solubility in the host oxide, insolubility in water, and absence of catalytic activity in regard to oxidation of water. $TiO_2$ and titanates of group IIA metals doped with $Nb^{+4}$ or $Ta^{+4}$ stand out as excellent combinations in this regard.

Considerations of conductivity, compactness and ruggedness argue that the electrode comprise a metal substrate coated with an oxide layer. Ti-metal coated with $TiO_2$ doped with $Nb^{+4}$ or $Ta^{+4}$ is clearly superior to all other possibilities. The advantages of this combination include the extreme corrosion resistance of Ti, moderate cost and ready availability of Ti, very low cost of $TiO_2$, and the extreme insolubility of $NbO_2$ and $TaO_2$.

While we believe that the theoretical explanations presented in this section are correct, we do not wish to be bound by them.

Description of the Invention—Practical Considerations

The concentration of HO.(aq) will usually be limited by fast reaction with potential substrates present in solution; even bicarbonate will react with HO.(aq) if no better substrates are present. If the solution is exceptionally inert (for example, dilute sodium sulfate with no organics present), $h_0$ will be limited by the reactions of hydroxyl radicals with each other to give hydrogen peroxide and then oxygen:

$$2HO. \rightarrow H_2O_2 \quad (12a)$$

$$2HO. + H_2O_2 \rightarrow O_2 + 2H_2O \quad (12b)$$

For this reason, the concentration of HO.(aq) present in solution is never large, and decreases very rapidly with distance from the surface of the anode. Theoretical estimates indicate that the concentration of HO.(aq) will practically drop to zero within 1 µm of the surface of the anode. Therefore, solute molecules must come within 1 micrometer of the anode in order to react with HO.(aq) and be destroyed. Organic molecules oxidized by reaction with S.OH at the surface of the anode must, of course, diffuse to the surface of the anode. In either case, the rate of mass transfer limits the rate of reaction when the concentration of substrate molecules in solution is small. This circumstance is henceforth referred to as "the diffusion limited regime".

If the concentration of the substrate in solution and the rate of mass transfer are large in relation to the current, the "current limited regime" may be attained, wherein the current through the anode determines the overall rate of reaction, and sufficient substrate molecules reach the electrode surface to react with all of the hydroxyl produced at the surface of the anode.

Two configurations of the electrochemical cell have been identified as particularly advantageous for promoting good mass transfer; these are the bipolar electrochemical cell and the porous anode cell depicted in FIGS. 2 and 6 of the related patent application identified above. The bipolar cell is provided with means to recirculate the aqueous medium within the cell and to induce turbulence in the flowing water. The porous anode cell has an extremely large anode area and substrate molecules need diffuse a very short distance only to reach the surface of the anode.

An electrolytic water purification method requires that the water to be purified have sufficient electrical conductivity to conduct the necessary current without excessive ohmic losses. It may be necessary to add an innocuous electrolyte to the water in order to increase its conductivity. If the substrate contains the element chlorine, sulfur, nitrogen or phosphorus, the reaction may produce strong acids (hydrochloric, sulfuric, nitric or phosphoric, respectively), and it may be necessary to buffer the electrolyte and to add base to neutralize the acid produced.

Adding sodium carbonate to the electrolyte is advantageous for the purposes outlined in the preceding paragraph. Reaction of carbonate ion with carbon dioxide produced by the oxidation reaction will convert carbonate ion to bicarbonate. Sodium carbonate is very inexpensive, and the occupational and environmental hazards associated with it are small. The small concentration of sodium bicarbonate remaining in the treated water will not require special treatment or costly disposal.

The arguments for an absolute maximum pH of 12 and a preferred maximum pH of 9 have been presented above. The oxidation of organic compounds dissolved in the water will produce carbon dioxide. The combination of bicarbonate with excess carbon dioxide in solution will buffer the electrolyte at a pH value between 7.5 and 9.

Organic acids will be produced as intermediate reaction products in the oxidation of organic compounds, and many of these acids will have $pK_a$ between 4 and 5. By adding the appropriate amount of sodium carbonate to the water, it is an easy matter to buffer the pH of the solution within this range, without the need to recirculate carbon dioxide produced by the reaction, and completely without interference from carbonate or bicarbonate. Operation at lower pH will decrease the overvoltage at the cathode (which generates hydrogen at large values of current density), thereby decreasing cell voltage and energy cost.

It is desirable to maintain the water in the process near saturation with atmospheric oxygen, in order to allow hydrogen peroxide to be produced at the cathode, and allow reactions with. $O_2$ to help degrade the substrate molecules. Saturation with air is most readily accomplished by bubbling air through the water at one or more points within the process. The need to add air must be balanced with the need to keep an adequate concentration of carbon dioxide dissolved in the water. This may be accomplished by limiting the volume of air bubbled through the water, and by reusing the air within the system, so that carbon dioxide in the air is partially returned to the water.

The process will consume electrical energy, which will ultimately be converted to sensible heat in the water. If the concentration of organic materials to be oxidized is large, the temperature increase will be large in proportion. At elevated temperature, steam will dilute oxygen and carbon dioxide in the air bubbles, and decrease the concentrations of these gases in solution. It is preferred that the temperature of the water not rise above approximately 90° C., in order to ensure that sufficient oxygen and carbon dioxide remain in the water.

In application to pesticide waste, the solubility of the pesticide may be an important controlling factor. Many of these compounds have low solubility in water, and are applied in the form of dispersions of droplets or solid particles in water. The concentration of the substrate dissolved in the water limits the rate at which the substrate will diffuse toward the anode, where it is destroyed. Increasing the temperature of the water will usually increase the solubility of the pesticide, and for this reason it may be preferable to operate the process at the maximum possible temperature, subject to the 90° C. limitation outlined above. If the concentration of substrate is small, the temperature rise in the water will be correspondingly small. In this case, it may be advantageous to use a regenerative heat exchanger to recover heat from the treated water exiting the process and transfer it to the water entering the process. The success of this technique requires a temperature increase large enough to drive the heat exchange process. With appropriate design, a temperature increase of less than 10° C.

should suffice. We estimate that pesticides with a room temperature solubility greater than 30 mg/liter can be efficiently destroyed by the process operating at 90° C.

DESCRIPTION OF THE INVENTION—DRAWING FIGURES

By way of example, operation and embodiments of the present invention will now be described with reference to the accompanying drawings, of which:

DESCRIPTION OF THE INVENTION—LIST OF REFERENCE NUMERALS

FIG. 5

20 Data collected with total current=152 mA which corresponds to i=20 mA $cm^{-2}$. Loss of toluene is due to oxidation plus loss to the atmosphere.

22 Data collected with current off (Control) illustrates loss of toluene by loss to the atmosphere during the experiment.

FIG. 6

24 Optical density at 278 nm reflects concentration of p-cresol plus some UV absorbing reaction products.

26 Optical density at 300 nm due mostly to reaction products.

FIG. 7

16 log i vs. $V_{cell}$ for an anode doped with 4 mole percent Nb, annealled under $H_2$ containing small amount of water vapor.

18 log i vs. $V_{cell}$ for an anode doped with 4 mole percent Nb, but not annealled under $H_2$.

FIG. 8

28 voltammetric test data for typical Class I electrodes, prepared using organic coating solutions as described in Examples 1, 2 and 3 of the related patent application cited above.

30 voltammetric test data for a Class II electrode.

32 $E_{TO,bicarb}$ vs. $E_{anode}$ calculated using eqn. (5).

FIG. 9

12 equilibrium anode potential ($E_{O2/H2O}$) for reduction of oxygen to water at pH 4.72, calculated using eqn. (9).

13 minimum potential ($E_{TO}$) to produce HO.(aq) at i=0.25 mA $cm^{-2}$ in acetate buffer, calculated using eqn. (7).

14 estimated minimum potential ($E_{min}$) for producing S.OH sufficiently energetic to oxidize a useful variety of substrates, calculated using eqn. (8).

FIG. 10

Figure 10:
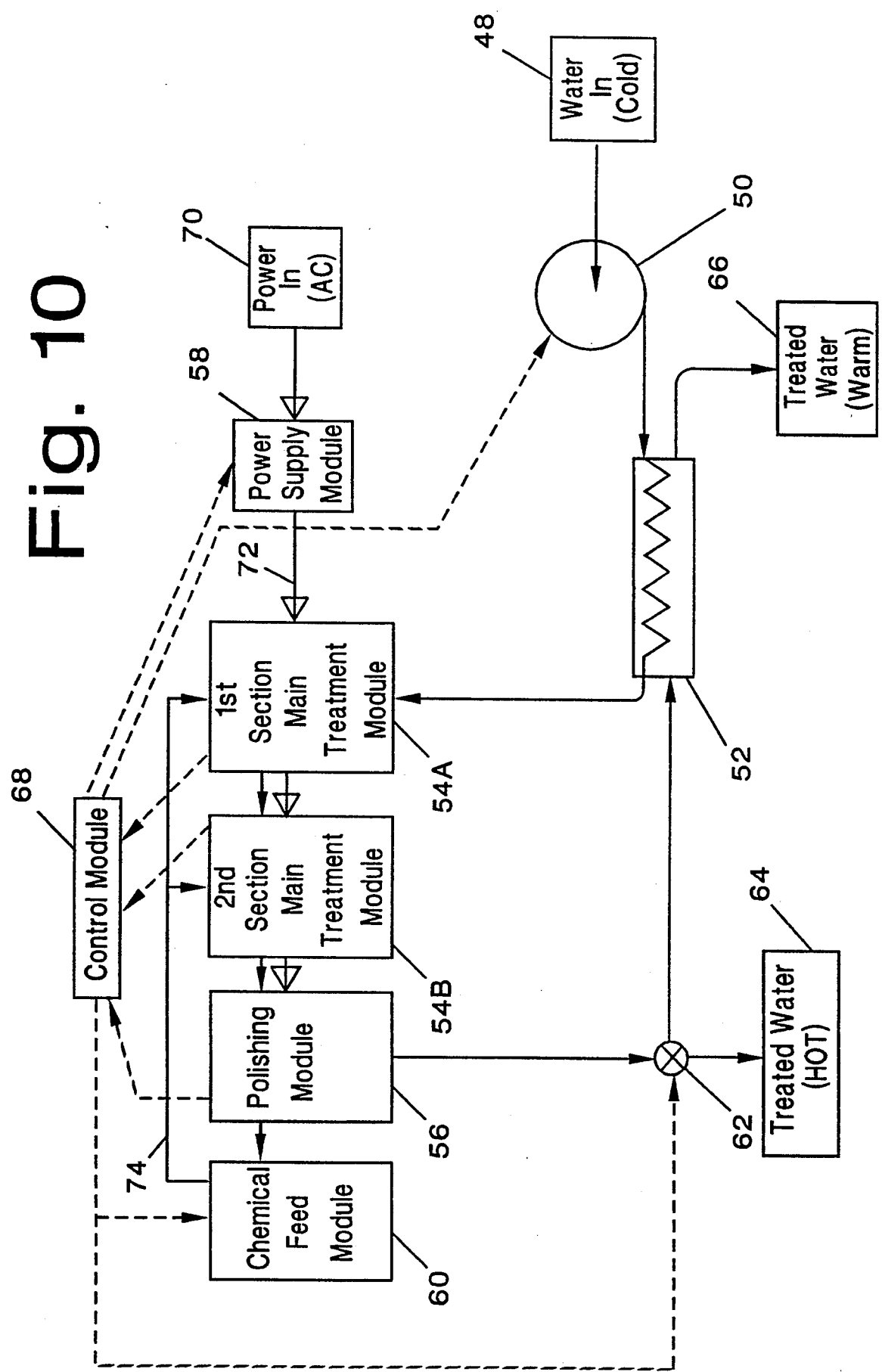
FIG. 10 depicts a complete water purification device utilizing the methods disclosed herein.
Figure 11:
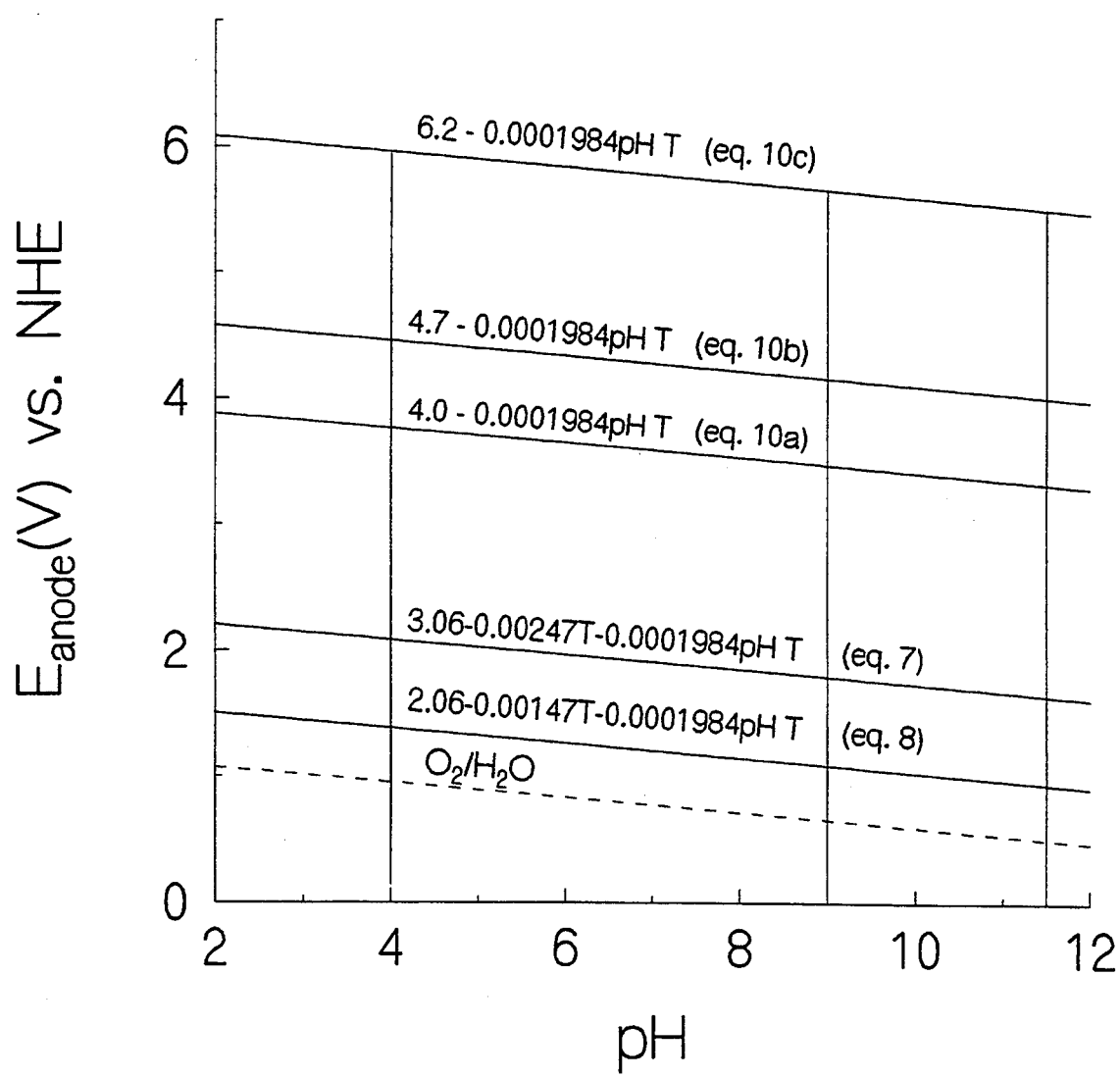
FIG. 11 illustrates the limits of $E_{anode}$ and pH recited in the claims, plotted for the special case T=298.15K.

In FIG. 10, solid arrows represent water flows, open arrows represent flows of electrical energy, and dashed lines represent data and control signals.

48 water to be treated entering the water treatment device
50 main water pump
52 heat exchanger
54A first section of the main treatment module
54B second section of the main treatment module
56 polishing module
58 power supply module
60 chemical feed module
62 temperature control valve
64 hot treated water
66 warm treated water
68 control module
70 AC power supplied to the water treatment device
72 DC power supplied to the electrochemical treatment modules
74 sodium carbonate solution provided to treatment modules as needed to control pH of the water

DESCRIPTION OF THE INVENTION—PREFERRED EMBODIMENTS

FIG. 10 illustrates a complete water treatment device in schematic form. Either bipolar cells or porous anode cells, depicted in FIGS. 2 and 6 of the above identified related patent application, may be used in the treatment modules. The porous anode cell has a very large active anode area, and affords excellent mass transfer performance. However, the electrical conductivity of the water restricts the maximum current density that may be used more severely than is the case with the bipolar cell. Therefore, the porous anode cell is preferred in application to low substrate concentrations.

The main water pump 50 powers and controls the flow of water 48 through the device. In the heat exchanger 52, the water entering the device acquires heat from the treated water 66 leaving the device, in order to increase the temperature within the main treatment module, which is ideally near 90° C. if substrates of limited water solubility are being oxidized; for example, many common pesticides. The main treatment module consists of one or more stages or sections; by way of example, two sections 54A and 54B are shown in FIG. 10. Each section consists of one or more electrochemical cells of the bipolar type or the porous anode type. The water is recirculated within each bipolar cell, to increase the velocity of water flow past the surface of the electrodes, thereby improving mass transfer.

Each section within the main treatment module is operated within the current limited regime. In practice, this means operation of the given section at the maximum current density consistent with efficient utilization of energy, given the concentration of substrate present in the water in that section. Thus, the current density in the second section is smaller than in the first, in proportion to the substrate concentration. The main treatment module destroys most of the substrate in an energy efficient manner. Bipolar cells are preferred over porous anode cells if the concentration of substrate is large. A bipolar cell may be used for the first section, together with a porous anode cell for the second section.

The polishing module 56 also consists of one or more electrochemical cells. The polishing module operates at least partly in the diffusion limited regime, and rapidly destroys most of the substrate remaining in the water after it has passed through the main treatment module. The polishing module is operated to achieve substrate concentration in the water leaving the water treatment device small enough to allow the water safely to be discharged to the environment. Because the amount of substrate to be destroyed in the polishing module is small, it may be operated in the relatively energy-inefficient diffusion limited regime without greatly increasing the total energy consumption of the process.

Because the substrate concentration will be small within the polishing module, a porous anode cell is preferred in this application, but a bipolar cell may also be used, provided with means to recirculate the water and thereby improve mass transfer. If a bipolar cell is used, it will be operated in the diffusion limited regime. If a porous anode cell is used, it may be operated in the current limited regime at the inlet, and in the diffusion limited regime at the outlet. Because a porous anode cell includes a multiplicity of porous anodes in sequence without recirculation of water, it naturally mimics a sequence of small treatment stages.

If the concentration of substrate is small, the main treatment module and the polishing module may be replaced by a single porous anode cell, wherein the part near the water inlet functions as the main treatment module in the current limited regime, while the part near the outlet functions as the polishing module in the diffusion limited regime.

The power supply module 58 converts the electrical power supplied to the device, most probably 220VAC or 480VAC, to the form required by the electrochemical cells, which will normally be DC power at a voltage determined by the number of bipolar electrodes in series within the individual cells, and the current density desired. A porous anode cell will require a larger current at a lower voltage.

The chemical feed module 60 consists of storage containers, pumps, and other equipment needed to provide sodium carbonate or other chemicals to the device, as needed to increase the electrical conductivity of the water to be treated and to control its pH. Sodium carbonate solution 74 is added to the water as needed to control pH.

The temperature control valve 62 controls the amount of hot treated water that is provided to the heat exchanger 52, and thereby determines the temperature increase in the water entering the device. Treated water not sent through the heat exchanger 64 is discharged from the device at full temperature. The treated water 66 that passes through the heat exchanger 52 is discharged from the device at a lower temperature.

The operation of the entire device is monitored and controlled by the control module 68. The control module monitors the temperature and pH of the water in the device, and the concentration of substrate and/or reaction products in the water leaving the device. It controls the main pump 50, the chemical feed module 60, the temperature control valve 62, and the power supply module 58 to achieve the level of treatment desired, while controlling the temperature and pH of the water, maximizing the flow rate of the treated water, and optimizing energy use. The control module may be a specialized unit designed for this service, or it may consist of a dedicated personal computer connected to appropriate sensors and actuators.

If the concentration of substrate is small, the temperature rise in the treated water will be small in proportion, and the heat exchanger and temperature control function may be unnecessary.

OPERATION OF INVENTION—EXAMPLES

EXAMPLE 1

An electrolytic cell was constructed utilizing two rectangular anodes coated on one side, installed back to back. The preparation of these anodes is described in Example 1 of the above identified related patent application. The total anode surface area immersed in the electrolyte was approximately 20 $cm^2$. The two cathodes were cut from 3.2 mm thick graphite plate with an equal area, and were installed on either side of the two anodes, facing them at a separation of approximately 6 mm. The electrolyte was 0.2M sodium bicarbonate, and air containing six percent carbon dioxide was bubbled through it. A magnetic stir-bar provided a moderate degree of turbulence to the electrolyte. A sufficient amount of a commercial herbicide preparation, Ortho Weed-B-Gon, was added to the electrolyte to give a total concentration of approximately 1860 mg/L of the active ingredients 2,4-dichlorophenoxyacetic acid (also called 2,4-D), and 2-(2-methyl-4-chlorophenoxy)-propionic acid. These two compounds are present in the preparation in approximately equal amounts in the form of the corresponding salts of dimethylamine. Both of these compounds absorb ultraviolet light with maximum absorption near 275 nm, and the progress of the reaction was monitored by periodically removing samples of the electrolyte and measuring UV absorbance at 275 nm. A total current of 500 milliamperes was provided to the cell (corresponding to i=25 mA $cm^{-2}$), and anode potential was approximately 3.5 v.

Figure 1:
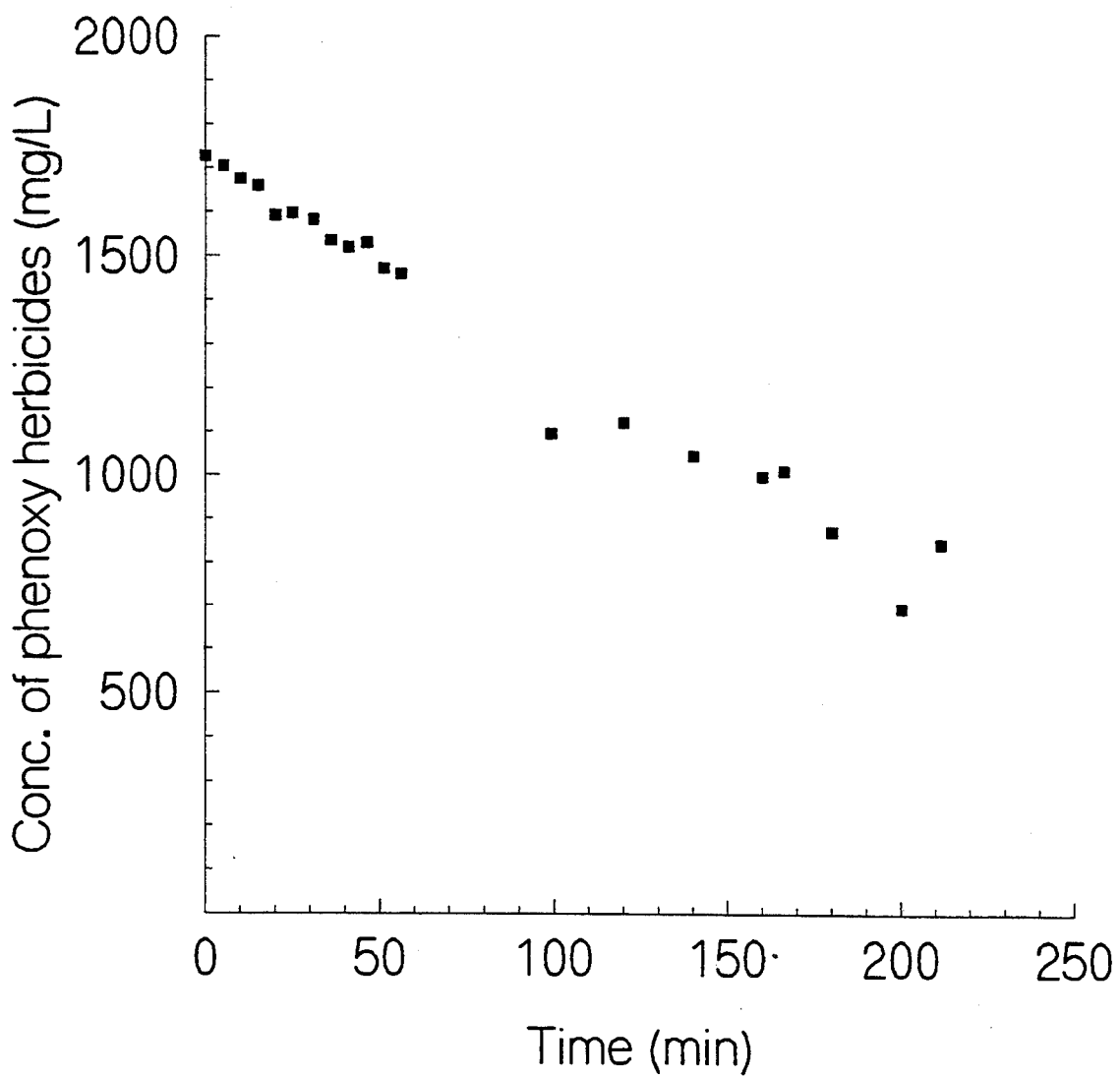
FIG. 1 depicts the destruction of a commercial phenoxyherbicide product utilizing said method.

The results are illustrated in FIG. 1. A steady decrease of substrate concentration is evident. While the reaction was in progress, the solution developed a brown coloration, which approached the color of coffee toward the end of the experiment, indicating the formation of some polymeric reaction products.

EXAMPLE 2

An electrolytic cell with a rotating anode was constructed. The anode was machined from Ti-Gr. 2 rod stock. The active anode was a cylindrical surface of 1.95 cm diameter by 4.45 cm high, with a surface area of 26.6 $cm^2$, coated with Nb-doped $TiO_2$ and heated under hydrogen following the procedure described in Example 1 of the above identified related application. The anode was rotated at 3000 revolutions per minute inside a concentric cylindrical cavity of 2.22 cm internal diameter machined in a block of graphite which served as the cathode and as the body of the cell. The electrolyte was provided to the cell using a peristaltic pump. The electrolyte entered the cell through a port below the level of the rotating anode, flowed up past the anode, and out of the cell through an overflow port located above the top edge of the anode. Air containing six percent carbon dioxide was bubbled through the electrolyte, entering the cell beneath the level of the anode. The electrolyte entering the cell was presaturated with the mixture of air and carbon dioxide before it was pumped into the cell.

TABLE 1

| Flow (mL/min) | Current (mA) | Optical Density | % Reacted | ε (%) | Resid. Time (min) |
|---|---|---|---|---|---|
| — | 0 | 1.422 | 0 | — | — |
| 5.28 | 520 | 1.332 | 6.3 | 31 | 2.0 |
| 1.90 | 520 | 1.059 | 25.5 | 45 | 5.6 |
| 1.90 | 260 | 1.209 | 15.0 | 53 | 5.6 |

The electrolyte contained 10 mM of the sodium salt of 2,4-D plus 90 mM of sodium bicarbonate. The electrolyte was analyzed for remaining 2,4-D by measuring UV absorbance at 275 nm of the electrolyte leaving the cell after diluting it ten-fold with deionized water. The results are summarized in Table 1. The first row is the unreacted solution used to calibrate the spectrophotometer. Under the conditions of this experiment the reaction was current limited. By assuming that each molecule of 2,4-D was fully oxidized once it reached the reaction zone at the surface of the anode, it was possible to calculate the current efficiency of the method, which is in fair agreement with the values obtained using sodium formate in Example 5.

At 520 mA total current (corresponding to i=20 mA cm$^{-2}$) $E_{anode}$=3.5 V and $V_{cell}$=5.5 V.

EXAMPLE 3

The same apparatus, electrode, and operating conditions were used as in Example 2. The electrolyte entering the cell contained 0.2 mM 2,4-D sodium salt plus 10 mM NaHCO$_3$. The concentration of 2,4-D was much smaller than in Example 2, and reaction conditions corresponded to the diffusion limited regime. The results are presented in Table 2. The current efficiency is low, but the percent of 2,4-D destroyed is large, ninety percent at the highest current. At 200 mA, $V_{cell}$=6.4 V, and at 400 mA, $V_{cell}$=8.2 v, due to the ten-fold smaller conductivity of the electrolyte in this case.

TABLE 2

| Flow (mL/min) | Current (mA) | % Reacted | ε (%) | Resid. Time (min) |
|---|---|---|---|---|
| — | 0 | 0 | — | — |
| 1.61 | 50 | 19.1 | 5.9 | 6.6 |
| 1.61 | 100 | 46.5 | 7.2 | 6.6 |
| 1.61 | 200 | 57.5 | 4.5 | 6.6 |
| 1.61 | 400 | 90.5 | 3.5 | 6.6 |

EXAMPLE 4

Figure 2:
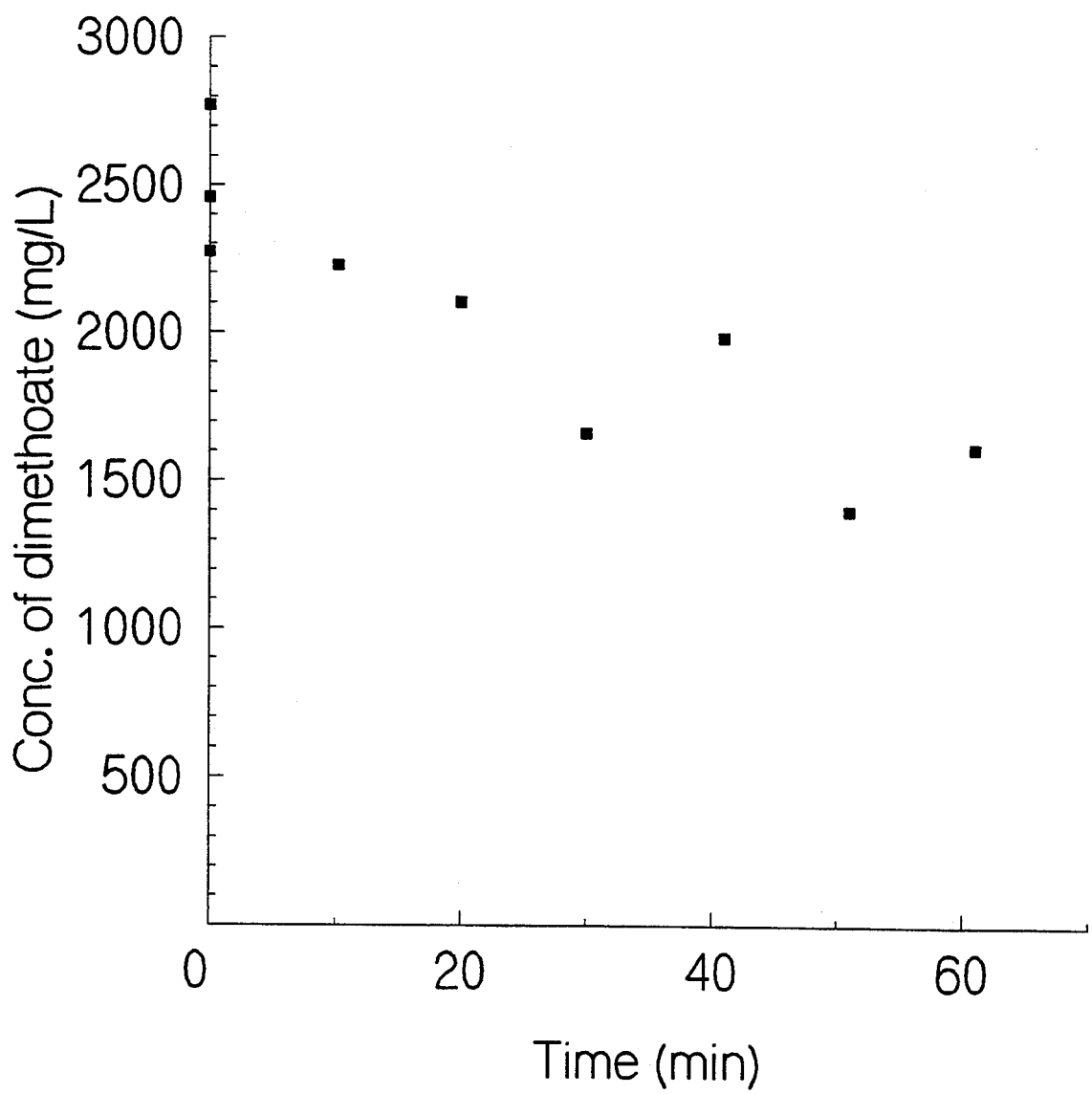
FIG. 2 depicts the destruction of the insecticide Dimethoate utilizing said method.

The same apparatus, electrodes, and experimental conditions were employed as in Example 1, except that total current equaled 400 mA, which corresponds to $V_{cell}$=8.0–8.3 V and $E_{anode}$≅3.5 V in this apparatus with this electrolyte. The insecticide Dimethoate was added in place of the herbicide, with an initial concentration of about 2500 ppm. Samples were periodically withdrawn for analysis by gas chromatography use a flame photometric detector (after extracting the Dimethoate in dichloromethane). The results are illustrated in FIG. 2. The Dimethoate concentration decreased with time. The periodic sawtooth pattern of the data points is an analytical artifact which was traced to difficulties associated with pipetting the highly volatile solvent.

EXAMPLE 5

The test cell used in Examples 5 to 9 consisted of a block of graphite (the cathode) with a 0.75" diameter cylindrical bore, with an anode in the form of a 0.25" diameter rod concentric with the bore and rotating at 400 to 600 rpm. An electrical cartridge heater imbedded in the block allowed operation with temperature increasing, or stable near 90° C. The solution volume was 16 mL, and the active anode area 7.6 cm$^2$. The current in various tests was 0.76, 7.6, 30.4, 76 or 152 mA, corresponding to current density i=0.1, 1, 4, 10 or 20 mA cm$^{-2}$.

Apparent current yield ε (moles hydroxyl produced/Faraday of electrons passed through the cell) was determined by using an electrolyte that contained

| | |
|---|---|
| 0.05M | Sodium formate |
| 0.05M | Sodium bicarbonate |
| 0.125N | Sodium sulfate |

The electrolyte was buffered by bubbling air containing six percent CO$_2$ through the cell.

Samples were taken every five minutes and analyzed by ion chromatography, using the ratio of heights of the formate and sulfate peaks as an indicator of reaction progress. The value of ε was estimated from the slope of the formate:sulfate ratio vs. time. At the lowest value of i=0.1 mA cm$^{-2}$, a test solution was diluted 1:50 was used, giving in an easily measurable slope. The values obtained for ε were ambiguous, because two oxidation mechanisms are possible for formate, requiring one mole of HO· per mole of formate ion ("Current Yield #1" in Table 3), and the other requiring two moles of HO· per mole of formate ("Current Yield #2").

TABLE 3

| Current density, i (mA cm$^{-2}$) | T (°C.) | Current Yield #1 (%) | Current Yield #2 (%) | $V_{cell}$ |
|---|---|---|---|---|
| 0.1 | 25 | 23 | 46 | |
| 1 | 25 | 22 | 44 | |
| 4 | 25 | 36 | 71 | |
| 10 | 25 | 46 | 91 | |
| 20 | 25 | 34 | 67 | |
| 1 | 85–90 | 90 | 179 | 1.5 |
| 4 | 85–90 | 93 | 186 | 2.4 |
| 10 | 85–90 | 58 | 115 | |
| 20 | 85–90 | 46 | 93 | 2.7 |

Two series of experiments were run, one at about 25° C., and the other at 85°–90° C. The results are summarized in Table 3, and the data collected at the higher temperature are presented in FIG. 3. It is believed that "Current Yield #2" is correct at 25° C., and "Current Yield #1" is correct at 85°–90° C.; a change in oxidation mechanism is the simplest explanation for the large apparent increase in ε with temperature and, of course, ε must not exceed 100%.

At the higher temperature ε was rather large, and $V_{cell}$ was quite small. Comparison with FIG. 9 and other data collected using the same electrode in the same apparatus indicates that for i=0.1–4 mA cm$^{-2}$ $E_{anode}$<$E_{TO}$ calculated using eqn. (7); therefore, these data demonstrate the ready oxidation of formate ion by reaction with S.OH.

Figure 3:
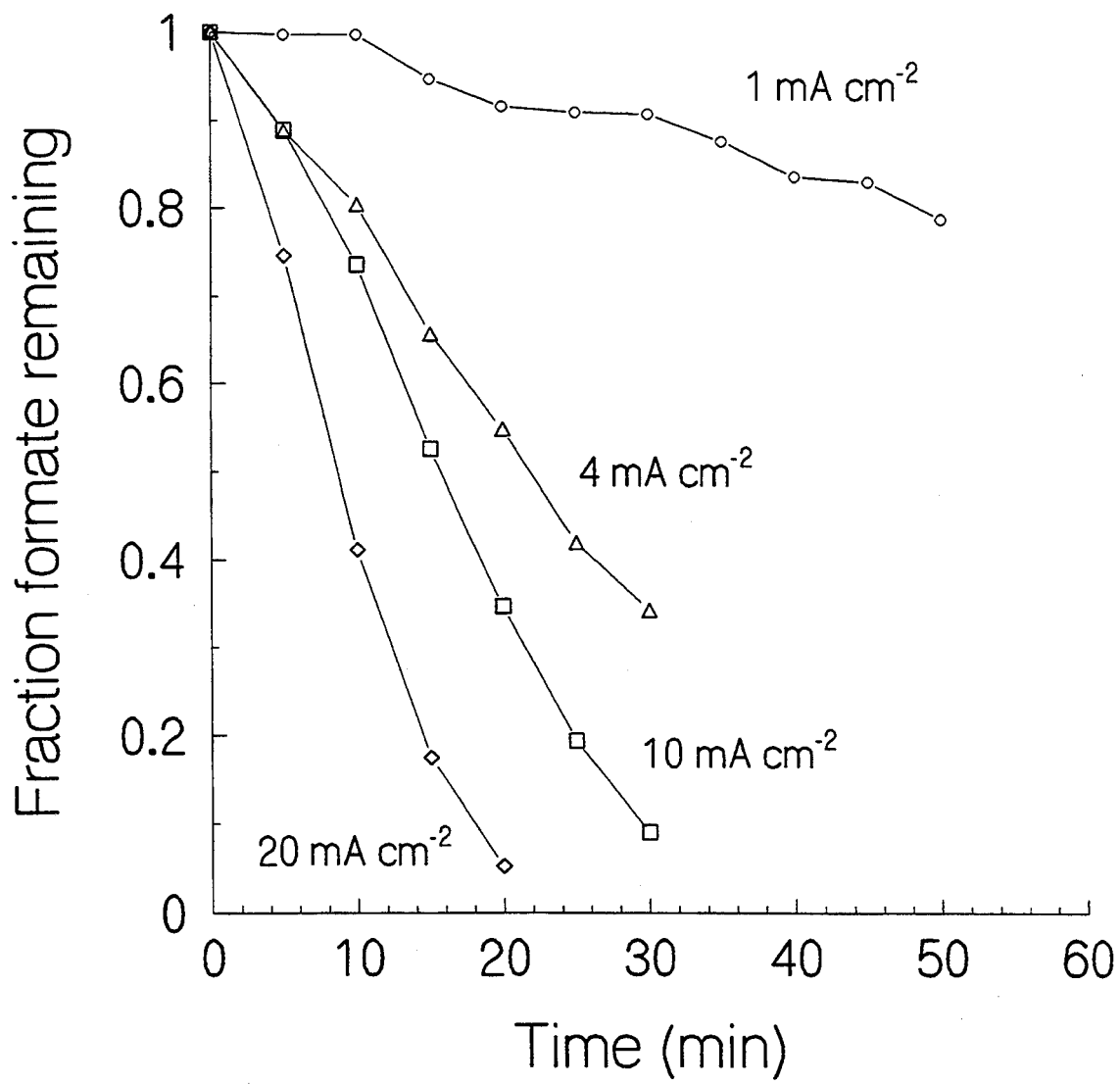
FIG. 3 depicts the oxidation of formate ion at 90° C. and various current densities.
Figure 8:
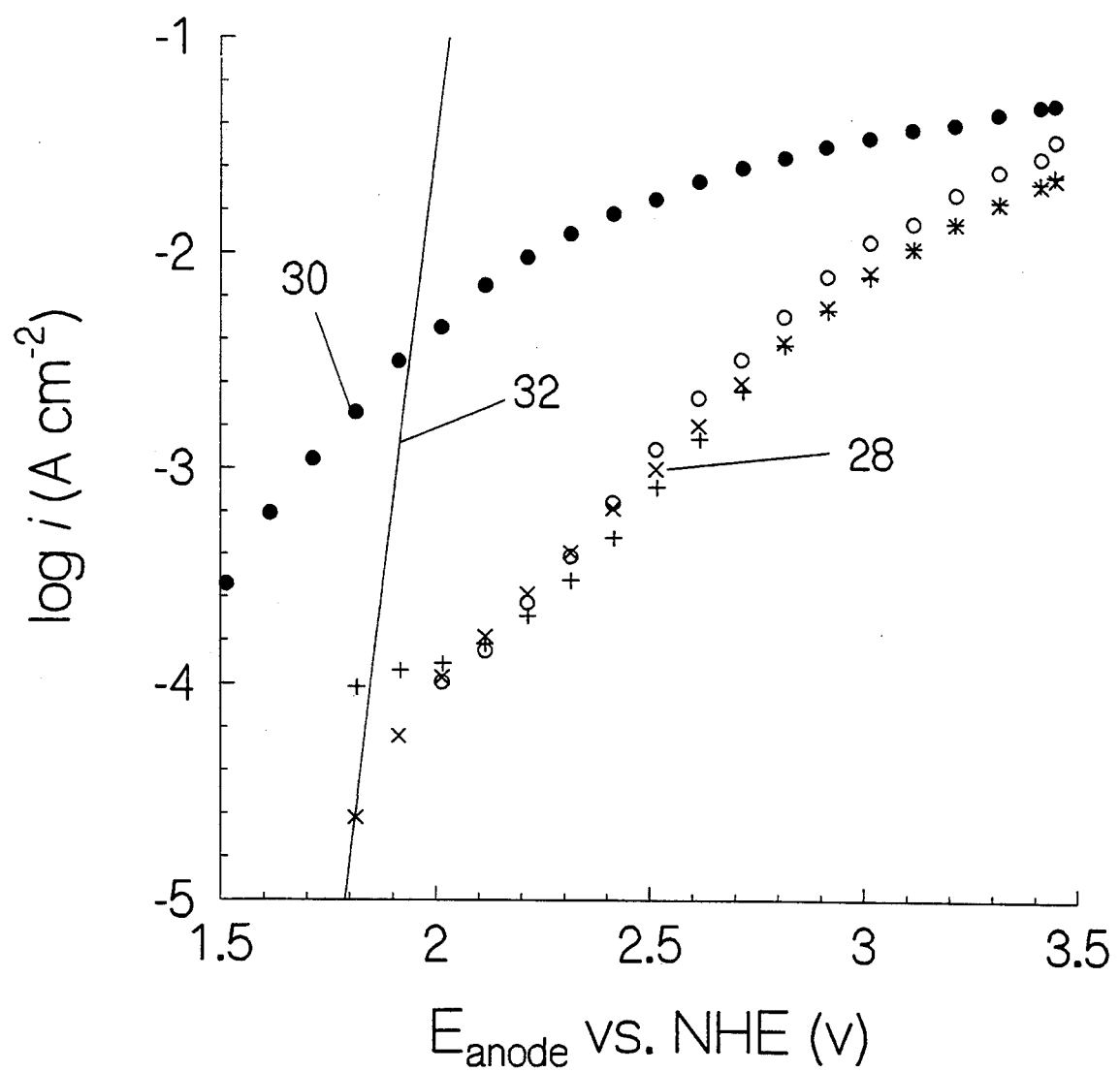
FIG. 8 illustrates the relationship of current density vs. anode potential for a series of electrodes prepared using organic coating solutions as described in Examples 1 to 3 of the above identified related patent application.
Figure 9:
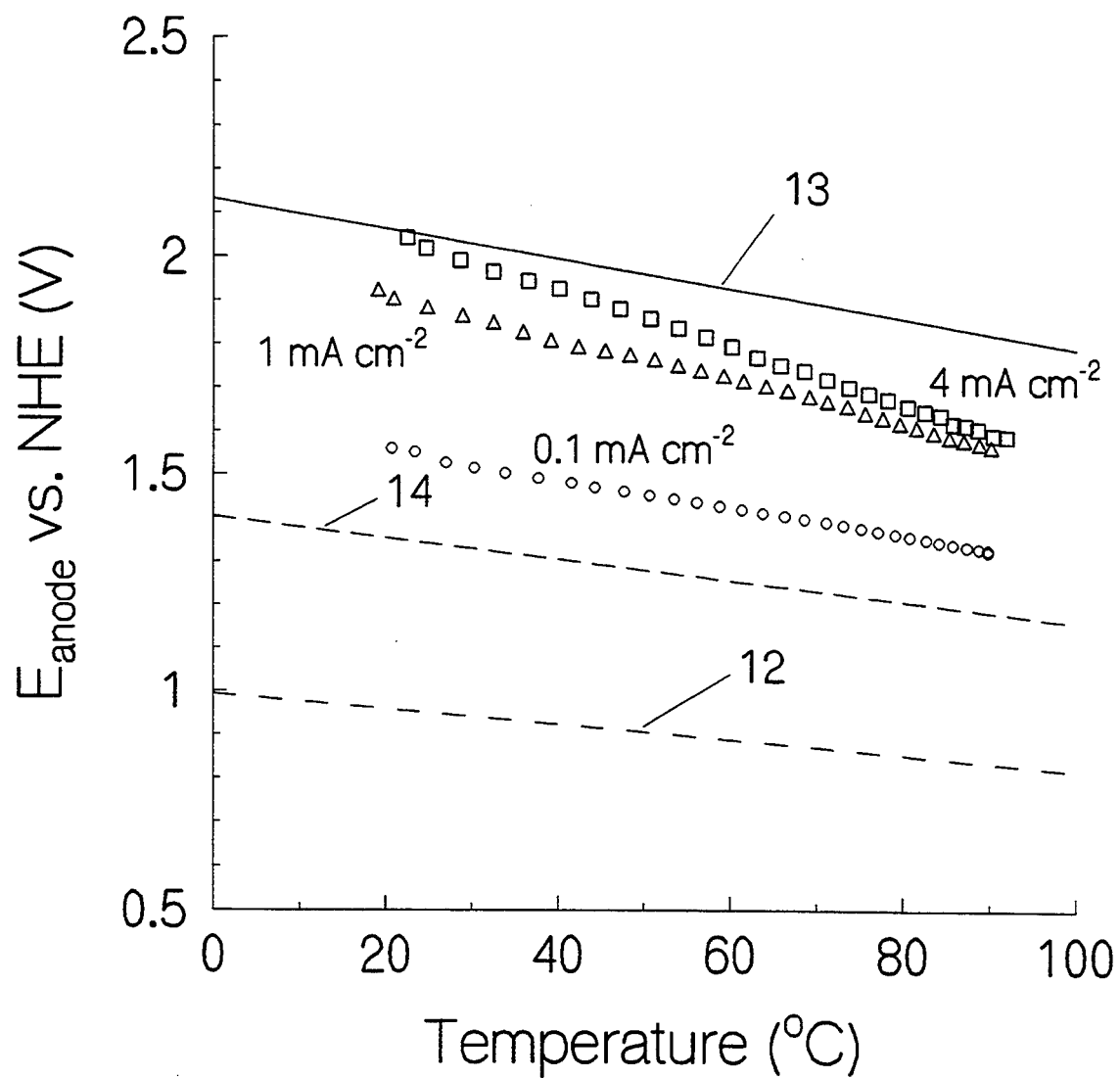
FIG. 9 illustrates the practical lower limits of anode potential required to generate HO.(aq) and S.OH, and illustrates operation of a Class II electrode in a range of potential where only S.OH is produced.

The electrode used to generate the data in FIGS. 3 and 9, and curve 30 in FIG. 8 exhibited very pronounced Class II behavior. Its preparation and history are summarized in Example 10, below.

EXAMPLE 6

Aqueous film forming foams (AFFF) containing alkyl fluorocarbon surfactants are widely used in extinguishing fires, and in realistic fire-fighting exercises. The 3M Company's product FC-203CE is typical. These exercises produce large volumes of water containing the AFFF product which can cause severe foaming if this water is discharged to conventional waste water treatment facilities.

Figure 4:
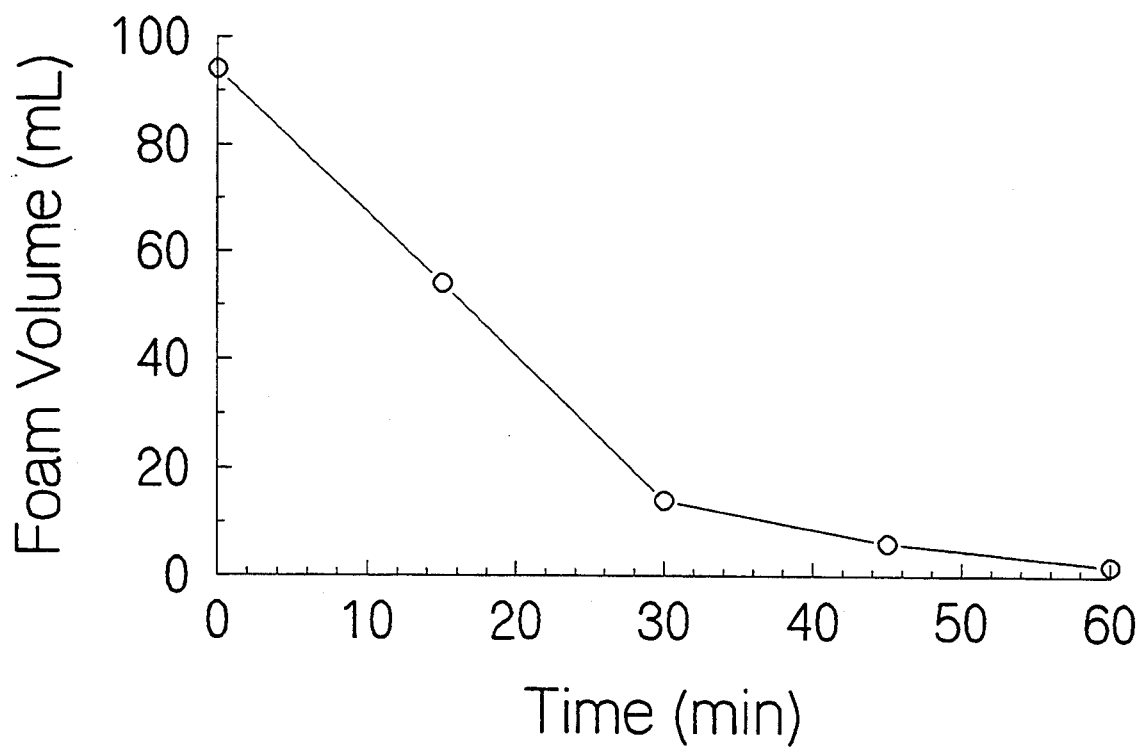
FIG. 4 depicts the destruction of the foaming ability of Aqueous Film Forming Foam, 0.3 v/v% 3M Product FC-203CE in 0.2N $NaHCO_3$.

FIG. 4 illustrates the destruction of foaming ability of a 0.3 v/v% solution of FC-203CE in 0.2M bicarbonate buffer. The same apparatus was used as in Example 5, with total current=152 mA and $V_{cell}$ between 5 and 6 V.

"Foam volume" was measured after transferring the solution to a 100 mL graduated cylinder and bubbling 50 mL/min of air through it for 2.5 min using a coarse gas diffuser stone. Each data point was obtained in a separate test run for the time indicated. Beyond 30 minutes, only a small volume of very coarse foam was produced, which collapsed quickly after the diffuser stone was removed.

EXAMPLE 7

Figure 5:
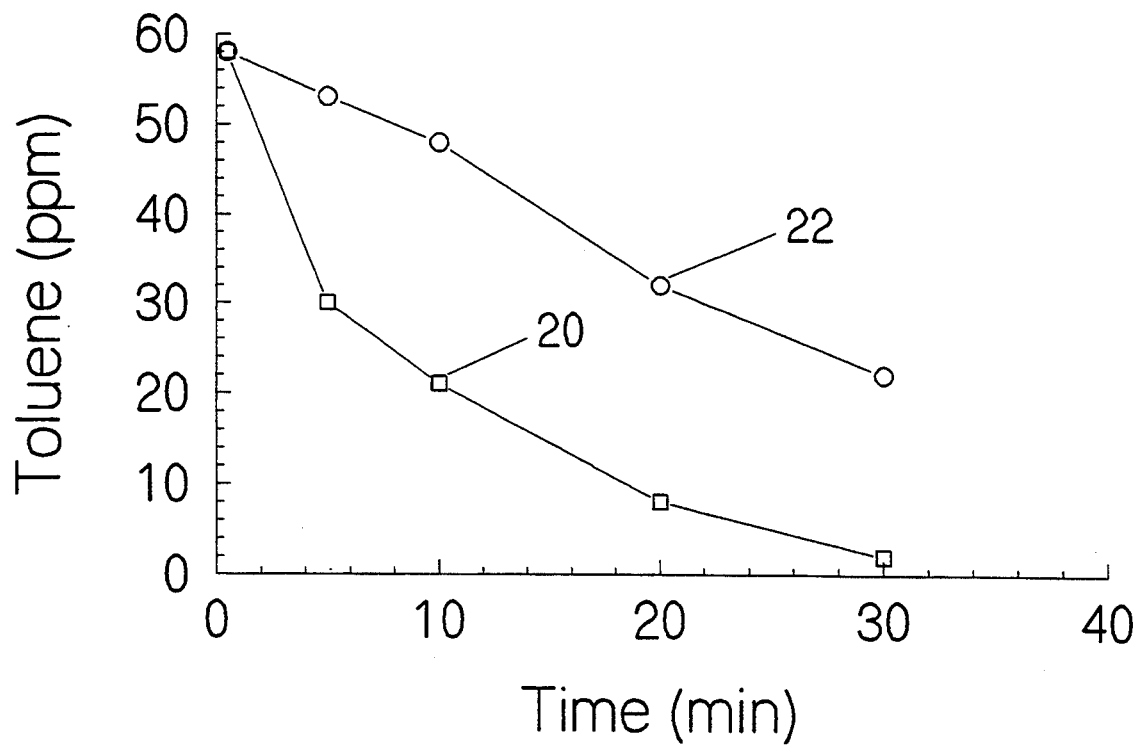
FIG. 5 depicts the oxidation of toluene.

FIG. 5 illustrates the oxidation of toluene in the same apparatus under the same conditions as in Example 6. The initial concentration was 58 ppm=0.63 mM in bicarbonate buffer, and the residual toluene was determined using a gas chromatograph equipped with a purge-and-trap unit and an FID detector. Being volatile, some toluene escapes from the test cell to the air. Each data point corresponds to a separate test. The "Control" series tests (plot 22) were run with zero current, but otherwise identical conditions to determine the rate of loss of toluene to the atmosphere. Plot 20 illustrates the decrease of toluene concentration with I=152 mA, due to oxidation together with loss to the atmosphere. The difference between the two curves corresponds to the amount of toluene oxidized.

EXAMPLE 8

Figure 6:
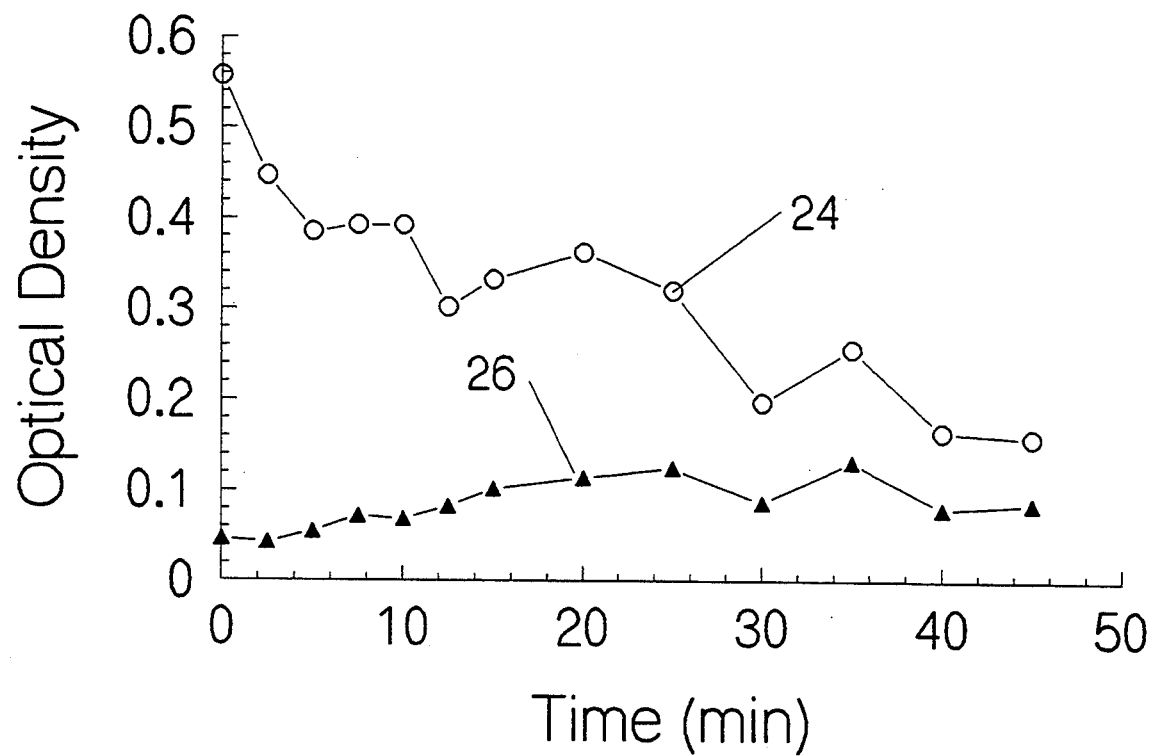
FIG. 6 depicts the oxidation of p-cresol.

FIG. 6 illustrates the oxidation of p-cresol in bicarbonate buffer in the same apparatus and under the same conditions as in Example 6. Residual cresol was estimated by monitoring UV absorption at 278 nm (plot 24). The initially rapid decline of O.D. is interrupted by the accumulation of less reactive reaction products which also absorb UV light to a lesser degree. At 300 nm cresol absorbs little (plot 26), and absorption at 300 nm is due mostly to the reaction products, confirming that at first they accumulate and then decline.

EXAMPLE 9

Figure 7:
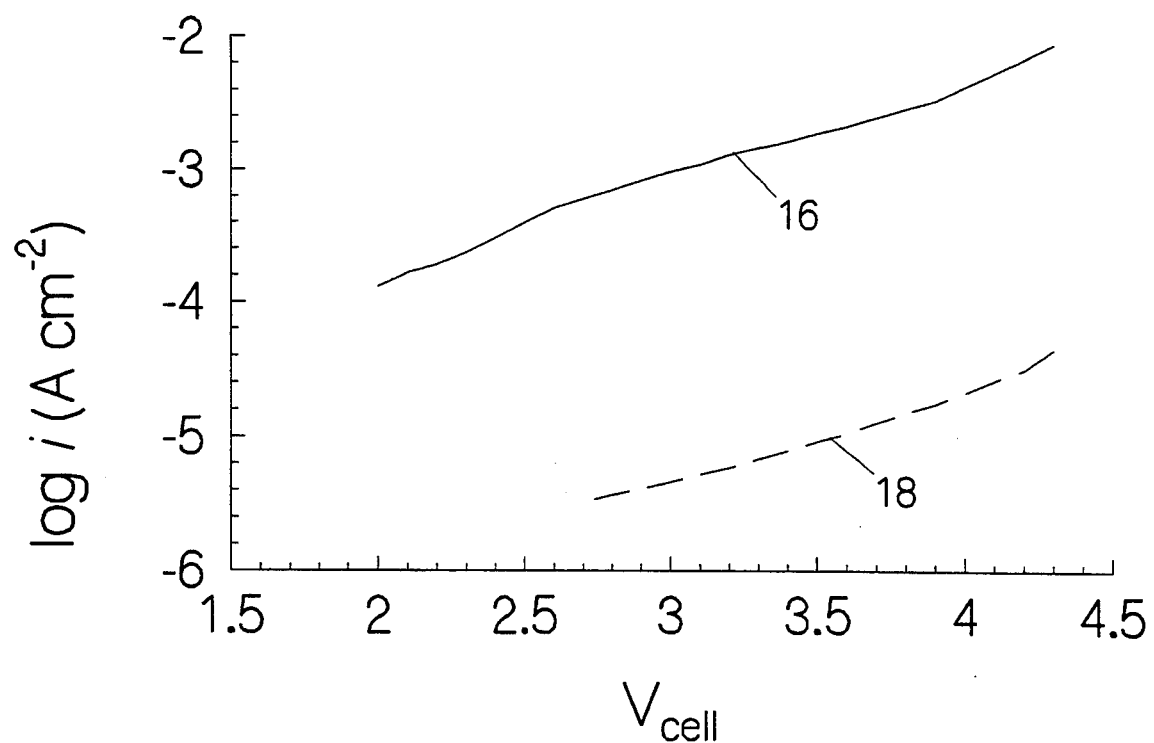
FIG. 7 illustrates the beneficial effect upon electrical conductivity of annealling the electrode in an atmosphere of hydrogen including a small concentration of water vapor.

FIG. 7 is reproduced from the above cited related patent application, wherein it was discussed in connection with Example 1 therein. It illustrates the large increase in current density obtained when an electrode is annealled under hydrogen to reduce $Nb^{+5}$ in the oxide coating to $Nb^{+4}$. The electrodes were tested voltammetrically using the same apparatus as in Example 5 at room temperature with bicarbonate buffer as the electrolyte.

EXAMPLE 10

FIG. 8 illustrates and contrasts Class I behavior and Class II behavior. The data labeled 28 were reproduced from FIG. 8 in the above cited related patent application. These three very similar electrodes were prepared using three distinct organic coating solutions as described in Examples 1 to 3 in the above cited related patent application. These three electrodes begin to conduct appreciably only when the turn-on potential is exceeded. Below the turn-on potential, $i<0.1$ mA $cm^{-2}$ for each of the three, and data was not collected at $E_{anode}<E_{TO,bicarb}$, either because i was small and erratic, or because i was too small to measure with our apparatus.

The electrode used to generate the data in FIGS. 3 and 9, and plot 30 in FIG. 8 exhibited very pronounced Class II behavior. The oxide coating was doped with 4 mole percent Nb, and the electrode was prepared as described in Example 8 of the above identified related patent application using an aqueous coating slurry. When first tested, it exhibited moderate Class II behavior, with $i \approx 0.5$ mA $cm^{-2}$ at $E_{TO}=1.91$ V. The Class II behavior became much more pronounced after it was operated several times in bicarbonate buffer and acetate buffer at 85°–90° C. (curve 30 in FIG. 8).

It is believed that the difference between Class I behavior and Class II behavior is related to the state of hydration of the surface of the anode; operation at high temperature tends to hydrate the surface, favoring Class II behavior. Class II behavior is also favored by cooling down the electrode under hydrogen after annealling it under hydrogen.

EXAMPLE 11

The data in FIG. 9 were collected using the same apparatus as in Example 5, and an acetate buffer containing 0.1M sodium acetate plus 0.1M acetic acid. The experiments were performed galvanostatically, with current (I) held constant while temperature was increased and I, $E_{anode}$, $V_{cell}$, and T were recorded. At $i=0.1–4$ mA $cm^{-2}$, all data points lie below the turn-on potential calculated using eqn. (7) and represented by line 13 in FIG. 9, indicating production of S.OH.

CONCLUSIONS, RAMIFICATIONS AND SCOPE

While our description contains many specificities, these should not be construed as limitations on the scope of the invention, but rather as an exemplification of one preferred embodiment thereof. Many other variations are possible, as described in the following paragraphs.

This method is unique in that organic materials dissolved in water may be oxidized in a nonspecific manner under mild conditions. The oxidation of formate ion, the herbicide 2,4-D, the insecticide Dimethoate, aqueous film forming foam, toluene, and cresol has been demonstrated. Oxidizable inorganic sulfur species soluble in water (for example, sulfite, thiosulfate, tetrathionate, hydrogen sulfide) can also be destroyed using this method.

Reactions at the cathode may also contribute to decomposing the substrate molecules, either by direct electrochemical reduction at the surface of the cathode, or by generating and releasing to solution hydrogen atoms, if the cathodic potential is sufficiently negative, and the surface of the cathode is not electrocatalytic for the generation of molecular hydrogen. The composition of the cathode surface may be selected and optimized for this purpose.

The method may be used to oxidize and degrade organic compounds dissolved in water, or it may be used to produce hydroxyl radicals for some different purpose; for example, to simulate the chemistry of radiolysis in the primary cooling water of a nuclear reactor. The organic compounds degraded in the method may be water soluble, aromatic hydrocarbons, or they may be pesticides, herbicides, or other agricultural chemicals, or other organic compounds. Oxidizable inorganic substances may also be oxidized.

While the primary applications of the methods disclosed herein are expected to be related to water purification and detoxification of aqueous hazardous wastes, electrochemically generated hydroxyl free radicals might also be used to conduct certain chemical syntheses, where the low selectivity of hydroxyl free radical reactions does not present a problem, and their great oxidizing ability is advantageous. Operation of Class II electrodes in the potential range where only surface bound hydroxyl free radicals are produced would be advantageous in these applications, because the reactions of S.OH are expected to be more selective than the reactions of HO.(aq).

Electrolytes may be added to the water purified in order to increase its conductivity or control its pH. Alkaline substances may be added to the water being purified in order to maintain the pH within the desired range. While sodium carbonate and sodium bicarbonate are the least expensive and most convenient alkalis for this purpose, other alkalis may also be used, including sodium hydroxide, potassium carbonate, potassium bicarbonate, potassium hydroxide, calcium hydroxide, and ammonia.

Even compounds of limited solubility may be oxidized efficiently if the method is operated at an elevated temperature in order to increase the solubility.

A water treatment device may be composed of several electrochemical cells and other parts and components necessary and beneficial to the process. In case of small substrate concentration, the device can be simplified by using porous anode cells and fewer of them (perhaps just one), and eliminating the heat exchanger and means for regulating temperature.

While we believe that bipolar electrochemical cells and porous anode cells are best suited for use in a practical water purification device, other kinds of cells may also be used.

We claim:

1. A method for producing hydroxyl free radicals, comprising the steps of:
    (a) providing an electrochemical cell including at least one cathode and at least one anode, wherein said anode having a surface and including a surface part and an internal part, wherein said surface part has a semiconducting metal oxide composition, wherein said anode has adequate resistance to corrosion when said anode is utilized in said method, and wherein said semiconducting metal oxide composition includes an additive metal wherein at least part of said additive metal is in an oxidation state which n-dopes said semiconducting metal oxide composition, and wherein mole fraction of said additive metal in said oxidation state relative to total metal in said semiconducting metal oxide composition is sufficient to impart conductivity to said semiconducting metal oxide composition adequate for operation of said method, and wherein said semiconducting metal oxide composition does not favor the generation of oxygen at said surface of said anode when said anode is utilized in said method, and
    (b) contacting said anode and cathode with an electrically conductive aqueous medium having a pH value, wherein said pH value is not less than 2, and wherein said pH value is not greater than 11.5, and
    (c) polarizing said anode to an anode potential wherein said anode potential is not less than $3.06 - 0.00247\ T - 0.0001984\ \mathrm{pH}\ T$ relative to the normal hydrogen electrode, and wherein said anode potential is not more than $6.2 - 0.0001984\ \mathrm{pH}\ T$ relative to the normal hydrogen electrode, thereby inducing a useful current density at said surface of said anode and producing hydroxyl free radical.

2. The method of claim 1, wherein
    said semiconducting metal oxide composition is comprised predominantly of $TiO_2$, and
    said additive metal is selected from the class consisting of Nb and Ta, and
    wherein concentration of platinum group metals in said semiconducting metal oxide composition is zero or too small to exert a significant electrocatalytic effect favoring the generation of oxygen.

3. The method of claim 2, wherein the average current density upon the part of said surface having said semiconducting metal oxide composition and in contact with said electrically conductive aqueous medium is at least one milliampere per square centimeter.

4. The method of claim 3, wherein
    mole fraction of said additive metal in the +4 valence state is not less than 0.25 percent and not more than twenty-five percent relative to total metal in said semiconducting metal oxide composition.

5. The method of claim 4, wherein said anode potential is not greater than $4.7 - 0.0001984\ T\ \mathrm{pH}$ relative to the normal hydrogen electrode.

6. The method of claim 5, wherein said internal part of said anode comprises a metallic substrate, with composition chosen from the class consisting of titanium and titanium alloys.

7. The method of claim 6, wherein mole fraction of said additive metal in the +4 valence state is not less than two percent and not more than six percent relative to total metal in said semiconducting metal oxide composition.

8. The method of claim 7, wherein said pH value is not less than 4, and not more than 9.

9. The method of claim 8, wherein said anode potential is not greater than $4.0 - 0.0001984\ T\ \mathrm{pH}$ relative to the normal hydrogen electrode.

10. A method for oxidizing chemical substances dissolved or dispersed in an electrically conductive aqueous medium having a pH value, comprising the steps of:
    (a) providing an electrochemical cell including at least one cathode and at least one anode, wherein said anode having a surface and including a surface part and an internal part, wherein said surface part has a semiconducting metal oxide composition, wherein said semiconducting metal oxide composition has adequate resistance to corrosion when said anode is utilized in said method, and wherein said semiconducting metal oxide composition includes an additive metal
   wherein at least part of said additive metal is in an oxidation state which n-dopes said semiconducting metal oxide composition, and
   wherein mole fraction of said additive metal in said oxidation state relative to total metal in said semiconducting metal oxide composition is sufficient to impart conductivity to said semiconducting metal oxide composition adequate for operation of said method, and
wherein said semiconducting metal oxide composition does not favor generation of oxygen at said surface of said anode when said anode is utilized in said method, and
(b) contacting said anode and cathode with said electrically conductive aqueous medium
   wherein said pH value is not less than 2, and
   wherein said pH value is not greater than 11.5, and
(c) polarizing said anode to an anode potential
   wherein said anode potential is not less than 2.06−0.00147 T −0.0001984 pH T relative to the normal hydrogen electrode, and
   wherein said anode potential is not more than 6.2−0.0001984 pH T relative to the normal hydrogen electrode, and
thereby producing useful amounts of hydroxyl free radicals at said surface of said anode, and oxidizing said chemical substances dissolved or dispersed in said electrically conductive medium with said hydroxyl free radicals at a useful rate, wherein said oxidation reaction decompose said chemical substances, or cause useful chemical transformations.

11. The method of claim 10, wherein
said semiconducting metal oxide composition is comprised predominantly of $TiO_2$, and
said additive metal is selected from the class consisting of Nb and Ta.

12. The method of claim 11, wherein
mole fraction of said additive metal in the +4 valence state is not less than 0.25 percent and not more than 25 percent relative to total metal in said semiconducting metal oxide composition, and
wherein concentration of platinum group metals in said semiconducting metal oxide composition is zero or too small to exert a significant electrocatalytic effect favoring the generation of oxygen.

13. The method of claim 12, wherein said anode potential is not greater than 4.7−0.0001984 T pH relative to the normal hydrogen electrode.

14. The method of claim 13, wherein said chemical substances are organic substances.

15. The method of claim 14, wherein the current density upon the part of said surface having said semiconducting metal oxide composition and in contact with said electrically conductive aqueous medium is not less than one milliampere per square centimeter.

16. The method of claim 15, wherein said anode potential is not less than 3.06−0.00247 T−0.0001984 pH T relative to the normal hydrogen electrode.

17. The method of claim 16, wherein said pH value is not less than 4, and not more than 9.

18. The method of claim 17, wherein said internal part of said anode comprises a metallic substrate, with composition chosen from the class consisting of titanium and titanium alloys.

19. The method of claim 18, wherein mole fraction of said additive metal in the +4 valence state is not less than two percent and not more than six percent relative to total metal in said semiconducting metal oxide composition.

20. The method of claim 19, wherein said anode potential is not greater than 4.0−0.0001984 T pH relative to the normal hydrogen electrode.

* * * * *